United States Patent
Liu et al.

(10) Patent No.: US 10,305,621 B2
(45) Date of Patent: May 28, 2019

(54) BURST-MODE DISCRETE MULTI-TONE FOR NETWORKS

(71) Applicant: Futurewei Technologies, Inc., Plano, TX (US)

(72) Inventors: Xiang Liu, Marlboro, NJ (US); Huaiyu Zeng, Red Bank, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/637,868

(22) Filed: Jun. 29, 2017

(65) Prior Publication Data

US 2018/0034579 A1 Feb. 1, 2018

Related U.S. Application Data

(60) Provisional application No. 62/366,736, filed on Jul. 26, 2016.

(51) Int. Cl.
*H04J 14/08* (2006.01)
*H04Q 11/00* (2006.01)
(Continued)

(52) U.S. Cl.
CPC ............ *H04J 14/08* (2013.01); *H04B 10/272* (2013.01); *H04J 14/0282* (2013.01);
(Continued)

(58) Field of Classification Search
CPC ............... H04J 14/08; H04J 2203/0089; H04J 14/0282; H04L 25/0224; H04L 25/0204;
(Continued)

(56) References Cited

U.S. PATENT DOCUMENTS

| 7,580,643 B2 * | 8/2009 | Moore | H04B 10/40 398/189 |
| 2004/0228417 A1 * | 11/2004 | Kennedy | H04L 25/022 375/260 |

(Continued)

FOREIGN PATENT DOCUMENTS

| CN | 102291360 A | 12/2011 |
| CN | 102318305 A | 1/2012 |
| CN | 103178900 A | 6/2013 |

OTHER PUBLICATIONS

Liu, et al., "Intra-Symbol Frequency-Domain Averaging Based Channel Estimation for Coherent Optical OFDM," Optics Express, vol. 16, No. 26, Dec. 22, 2008, pp. 21944-21957.

(Continued)

*Primary Examiner* — Leslie C Pascal
(74) *Attorney, Agent, or Firm* — Conley Rose, P.C.

(57) ABSTRACT

A method implemented by a first network element (NE) comprises receiving, by a receiver of the first NE, a burst from a second NE, wherein the burst comprises at least one training symbol (TS), storing, by a memory of the first NE, a channel response for a link between the first NE and the second NE, wherein the first NE is communicatively coupled to the second NE, wherein the channel response is based on a current channel response estimated using at least one TS in the burst and a previously stored channel response, and wherein the previously stored channel response is based on a plurality of bursts previously received from the second NE, and compensating, by a processor coupled to the receiver and the memory of the first NE, modulated symbols in the burst using the channel response.

20 Claims, 12 Drawing Sheets

(51) Int. Cl.
   *H04J 14/02*     (2006.01)
   *H04L 25/02*     (2006.01)
   *H04L 27/26*     (2006.01)
   *H04B 10/272*    (2013.01)

(52) U.S. Cl.
   CPC ..... *H04L 25/0224* (2013.01); *H04Q 11/0067* (2013.01); *H04J 2203/0089* (2013.01); *H04L 25/0204* (2013.01); *H04L 27/2647* (2013.01)

(58) Field of Classification Search
   CPC ............ H04L 27/2647; H04Q 11/0067; H04B 10/272
   See application file for complete search history.

(56) References Cited

U.S. PATENT DOCUMENTS

| | | | |
|---|---|---|---|
| 2010/0080312 A1* | 4/2010 | Moffatt | H04B 1/713 375/260 |
| 2011/0026924 A1 | 2/2011 | Chung et al. | |
| 2011/0110672 A1* | 5/2011 | Blauvelt | H04B 10/693 398/202 |
| 2016/0142158 A1* | 5/2016 | Li | H04L 27/2613 455/63.1 |
| 2017/0170993 A1* | 6/2017 | Jia | H04L 25/03006 |

OTHER PUBLICATIONS

Machine Translation and Abstract of Chinese Publication No. CN102291360, Dec. 21, 2011, 16 pages.
Machine Translation and Abstract of Chinese Publication No. CN102318305, Jan. 11, 2012, 24 pages.
Machine Translation and Abstract of Chinese Publication No. CN103178900, Jun. 26, 2013, 17 pages.
Foreign Communication From a Counterpart Application, PCT Application No. PCT/CN2017/092385, English Translation of International Search Report dated Aug. 29, 2017, 7 pages.
Foreign Communication From a Counterpart Application, PCT Application No. PCT/CN2017/092385, English Translation of Written Opinion dated Aug. 29, 2017, 4 pages.

* cited by examiner

BURST-MODE DISCRETE MULTI-TONE FOR NETWORKS

CROSS-REFERENCE TO RELATED APPLICATIONS

The present application claims benefit of U.S. Provisional Patent Application No. 62/366,736 filed Jul. 26, 2016 by Xiang Liu and Huaiyu Zeng, entitled "Burst-Mode Discrete Multi-Tone for Passive Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

For upstream transmission in time-division multiplexing (TDM) passive optical networks (PONs), a common receiver in an optical line terminal (OLT) receives signals, such as a burst, from multiple optical network units (ONUs). Current TDM-PON systems mainly use an on-off-keying (OOK) modulation format, which is sensitive to noise. Other spectrally efficient modulation formats, such as orthogonal frequency division multiplexing (OFDM) and discrete multi-tone (DMT), may alternatively be used to increase the throughput of a PON system.

In conventional OFDM and DMT communications systems, data is modulated on subcarriers or tones used by the system. An inverse fast Fourier transform (IFFT) algorithm is performed on certain modulated tones to obtain a set of time domain samples for transmission, forming an OFDM symbol. DMT is mainly used in transmission systems where OFDM signals are real-valued.

SUMMARY

In one embodiment, the disclosure includes a method implemented by a first network element (NE), comprising receiving, by a receiver of the first NE, a burst from a second NE, wherein the burst comprises at least one training symbol (TS), storing, by a memory of the first NE, a channel response for a link between the first NE and the second NE, wherein the first NE is communicatively coupled to the second NE, wherein the channel response is based on a current channel response estimated using at least one TS in the burst and a previously stored channel response, and wherein the previously stored channel response is based on a plurality of bursts previously received from the second NE, and compensating, by a processor coupled to the receiver and the memory of the first NE, modulated symbols in the burst using the channel response. In some embodiments, the disclosure further includes wherein the at least one TS comprises a first TS and a second TS, wherein the first TS is at a beginning of a payload of the burst, wherein the second TS is at an end of the payload of the burst, and wherein the first TS and the second TS are used to determine the channel response. In some embodiments, the disclosure further includes wherein the modulated symbols are modulated according to a DMT modulation format, and/or wherein the channel response comprises a fine channel response in a frequency domain, and/or wherein the channel response includes a clock frequency difference between the first NE and the second NE, wherein the clock frequency difference between the first NE and the second NE is estimated by comparing a phase slope difference between frequency-domain channel responses estimated by two TSs received from the second NE and based on a time duration between the two TSs, and/or wherein the channel response is updated based on a weighted average of a plurality of previous channel responses and the current channel response.

In one embodiment, the disclosure includes an OLT, comprising a receiver configured to receive a burst from an ONU, wherein the burst comprises at least one TS, a memory configured to store a channel response for a link between the OLT and the ONU, wherein the channel response is based on a current channel response estimated using the at least one TS in the burst and a previously stored channel response, and wherein the previously stored channel response is determined using a plurality of bursts previously received from the ONU, and a processor coupled to the memory and the receiver and configured to compensate modulated symbols in the burst using the channel response. In some embodiments, the disclosure includes wherein the processor is further configured to compensate a clock frequency difference between the OLT and the ONU (i.e., first and second NEs), wherein compensating the clock frequency difference between the OLT and the ONU is based on interpolation, and/or wherein the channel response comprises a weighted average of a plurality of previous channel responses, wherein the plurality of previous channel responses are determined based on the plurality of bursts previously received from the ONU, and/or wherein the at least one TS in the burst is used to determine the current channel response for the burst, wherein the channel response is a weighted average between the current channel response and the previously stored channel response.

In one embodiment, the disclosure includes an OLT, comprising a receiver configured to receive a burst from an ONU, wherein the burst comprises at least one TS, a processor coupled to the receiver configured to obtain the at least one TS from the burst, and generate a current channel response for the burst transmitted by a link between the OLT and the ONU, and a memory coupled to the processor and configured to store a channel response for the link between the OLT and the ONU, wherein the channel response is based on the current channel response and a stored channel response, and wherein the stored channel response is based on a plurality of bursts previously received from the ONU. In some embodiments, the disclosure further includes wherein the processor is configured to compensate modulated symbols in the burst using the current channel response and the stored channel response, and/or wherein the current channel response comprises a fine channel response in the frequency domain, wherein the fine channel response is generated on a per-subcarrier basis, and/or wherein the stored channel response comprises a weighted average of a plurality of previous channel responses, wherein the plurality of previous channel responses are determined based on the plurality of bursts previously received from the ONU, wherein a weighting for the plurality of previous channel responses is between about 0.02 and about 0.2, and/or wherein the stored channel response includes a clock frequency difference between the OLT and the ONU, wherein the clock frequency difference between the OLT and the ONU is estimated by comparing a phase slope difference between frequency-domain channel responses estimated by two TSs from the ONU and based on a time duration between the two TSs.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
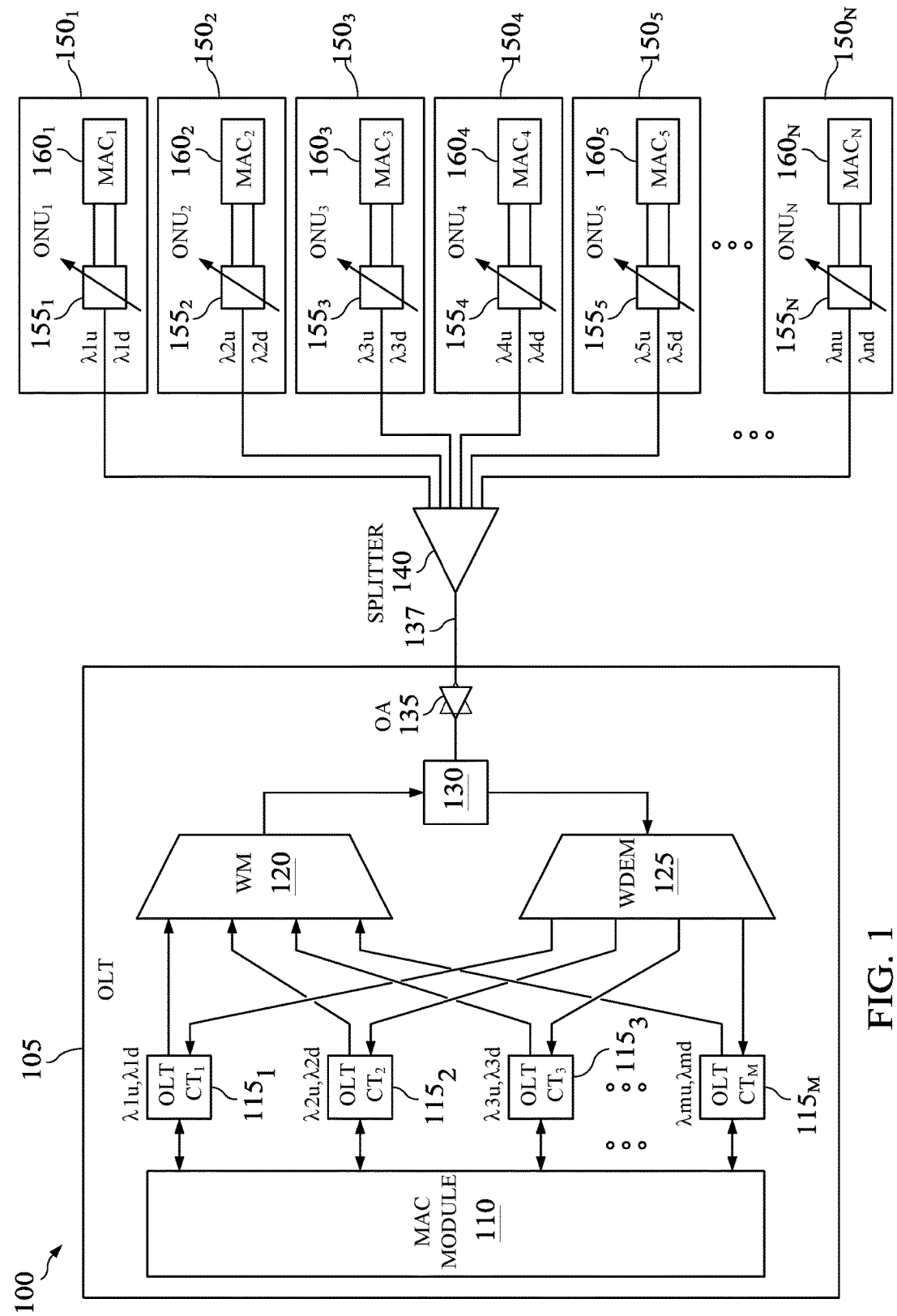
FIG. 1 is a schematic diagram of a time and wavelength-division multiplexing (TWDM) PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Channel tracking refers to performing channel estimation and channel compensation operations for a signal received via a link. For example, a receiver receives a signal comprising modulated symbols, from multiple transmitters at different times via different links. The signal may be a burst, which comprises at least one time-division multiple access (TDMA) segment of a signal. The signal may be an upstream signal transmitted from an ONU to an OLT. As the signal travels through the link, the signal gets distorted due to various external factors. When the receiver receives the signal from the transmitter, the receiver is configured to perform channel estimation on the signal. Channel estimation refers to determining how the signal has been distorted during transmission from the transmitter to the receiver via the link. For example, the receiver determines a channel response that quantifies how the link has distorted the signal. The channel response may be used to perform channel compensation for the signal. Channel compensation refers to reducing or removing the distortion identified by performing channel estimation on the signal. Therefore, the receiver performs channel estimation and channel compensation on a signal to ensure that the signal received matches the signal originally transmitted, to the greatest extent possible.

In a PON that implements OFDM or DMT modulation formats, a receiver at the OLT in the PON performs channel tracking for the bursts received from transmitters located at different ONUs in an ONU-dependent manner. The channel tracking is performed for each ONU because different ONUs may have different clock frequencies and phases when operating in burst-mode. Therefore, the channel response, or signal distortion, for a signal transmitted on a link between each ONU and the OLT is also ONU-dependent. Typically, in PONs, equipment residing at the homes of users has a given time slot to send data to a central office (CO). In this way, users send a short burst to the CO during every time slot. However, the typical channel tracking methods used for continuous-mode OFDM or DMT do not take advantage of the unique features of OFDM or DMT for PON.

OFDM and DMT communication systems use a periodic signal to perform channel estimation and channel compensation operations, such as signal detection and timing/frequency recovery. A periodic signal contains repeated training signals (TSs) that are added to the payload symbols at the transmitter. These TSs are known to the receiver such that the receiver uses the TSs to perform channel tracking operations, such as, but not limited to, time-synchronization (t-sync), frequency synchronization (f-sync), and initial clock phase offset compensation. Typically, OLTs cannot perform channel estimation and channel compensation for each ONU without the inclusion of numerous TSs transmitted with each payload. The more TSs that are sent with a payload, the more accurately the OLT can perform channel estimation to determine a channel response for a signal sent on link between the OLT and the ONU. However, transmitting several TSs over a link can cause unnecessary overhead in the transmission of data to and from a customer.

Disclosed herein are systems, methods, and apparatuses to implement a burst-mode OFDM or DMT with fast and accurate channel tracking mechanisms. In one embodiment, an OLT is configured to store channel estimation information for each ONU. The channel estimation information that is stored for the ONU is determined based on multiple bursts previously received from the ONU. For example, the channel estimation information may comprise a weighted average of channel responses determined based on preceding bursts received from the ONU. In one embodiment, the OLT is configured to perform channel tracking faster using the stored channel responses for the ONUs. In an embodiment, the OLT is configured to update the stored channel responses dynamically to increase the channel tracking speed and accuracy for the current burst from each ONU. In the embodiments disclosed herein, the stored channel response determined based on preceding bursts originated from an ONU can be used to aim the channel compensation of a current burst from the same ONU, thereby increasing both channel tracking speed and accuracy. The channel estimation information obtained during the current burst can then be used, with a given weight, for the channel compensation of the following burst from the same ONU.

FIG. 1 is a schematic diagram of a TWDM PON 100. The TWDM PON 100 can include n number of ONUs 150. The TWDM PON 100 is suitable for implementing the disclosed embodiments. The TWDM PON 100 may be a communications network that does not require any active components to distribute data between an OLT 105 and ONUs$_{1-N}$ 150$_{1-N}$ (ONUs 150). Instead, the TWDM PON 100 uses passive optical components to distribute data between the OLT 105 and the ONUs 150. The TWDM PON 100 adheres to any standard related to multiple-wavelength PONs. The TWDM PON 100 comprises the OLT 105, a splitter 140, and the ONUs 150.

The OLT 105 may be any device configured to communicate with the ONUs 150 and another network. For example, a backbone network connects the TWDM PON 100 to the Internet. Specifically, the OLT 105 acts as an intermediary between the other network and the ONUs 150. For instance, the OLT 105 forwards data received from the network to the ONUs 150 and forwards data received from the ONUs 150 to the other network. When the other network uses a network protocol that differs from the PON protocol used in the TWDM PON 100, the OLT 105 may comprise a converter (not shown) that converts the network protocol to the PON protocol. The OLT 105 converter can also convert the PON protocol into an appropriate network protocol, as needed.

The OLT 105 may comprise a media access control (MAC) module 110, OLT channel terminations (CT)$_{1-M}$ 115$_{1-M}$ (OLT CTs 115), a wavelength multiplexer (WM) 120, a wavelength demultiplexer (WDEM) 125, a local oscillator (LO) 130, and a bi-directional optical amplifier (OA) 135. The MAC module 110 may be any module suitable for processing signals for use at a physical layer in a protocol stack. For example, the MAC module 110 provides addressing and channel access control services to the physical layer, as described more fully below. For example, the MAC module 110 determines upstream and downstream transmission schedules and also performs packet address filtering operations. A downstream schedule comprises downstream transmission opportunities for the OLT 105 to transmit downstream signals to the ONUs 150. An upstream schedule comprises upstream transmission opportunities for the ONUs 150 to transmit upstream signals to the OLT 105. In an upstream direction or a downstream direction, the MAC module 110 instructs the OLT CTs 115 to transmit downstream signals to the ONUs 150 according to the downstream transmission schedules and to provide the upstream transmission schedules to the ONUs 150. In a receive or upstream direction, the MAC module 110 instructs the OLT CTs 115 to receive and process upstream signals transmitted by the ONUs 150 and performs packet processing functions. In an embodiment, the upstream signals may be bursts received from each of the ONUs 150. The OLT CTs 115 comprise transmitters (not shown) and receivers (not shown), among other things.

The transmitters comprise tunable lasers or other devices suitable for converting electrical signals into optical signals and transmitting the optical signals on separate downstream wavelength channels to the WM 120. The receivers comprise photodiodes or other devices suitable for receiving optical signals from a plurality of upstream wavelength channels and converting the received optical signals into electrical signals. As shown, the downstream wavelength channels employ a first set of m wavelengths at $\lambda 1_d$ to $\lambda m_d$ and the upstream wavelength channels employ a second set of m wavelengths at $\lambda 1_u$ to $\lambda m_u$. Each OLT CT 115 employs a pair of upstream and downstream wavelength channels to communicate with one or more ONUs 150. The WM 120 may be any suitable wavelength multiplexer, such as an arrayed waveguide grating (AWG). The WM 120 may multiplex the downstream wavelength channels signals generated by the OLT CTs 115 into a combined downstream signal and forward the combined downstream signal to the LO 130. The LO 130 adds characteristics to the combined transmitted signal in order for the ONUs 150 to properly extract the signals. The LO 130 then forwards the combined transmitted signal to the OA 135, which may amplify the combined transmitted signal as needed in order to forward the combined transmitted signal to a splitter 140 via an optical fiber 137. The OA 135 also receives a combined received signal from the splitter 140 via the optical fiber 137 and amplifies the combined received signal as needed in order to forward the combined received signal to the WDEM 125. The WDEM 125 may be similar to the WM 120 and may demultiplex the combined received signal into multiple optical signals, then forward the multiple optical signals to the OLT CTs 115.

The splitter 140 may be any device suitable for splitting the combined optical signals and forwarding the split signals to the ONUs 150. The splitter 140 may also be any device suitable for receiving signals from the ONUs 150, combining those signals into a combined received signal, and forwarding the combined received signal to the OA 135. For example, the splitter 140 splits a downstream optical signal into x split downstream optical signals in the downstream direction (e.g., from the OLT 105 to the ONUs 150), and combines y upstream optical signals into one combined upstream optical signal in the upstream direction (e.g., from the ONUs 150 to the OLT 105). The number of x split downstream optical signals may be the same as the n number of ONUs 150 or may be less than the n number of ONUs 150. The number of y upstream optical signals may be the same as the n number of ONUs 150 or may be less than the n number of ONUs 150.

The ONUs 150 may be any devices suitable for communicating with the OLT 105. The ONUs 150 may comprise wavelength tunable components 155$_{1-N}$ and MAC modules$_{1-N}$ 160$_{1-N}$, among other things. The wavelength tunable components 155$_{1-N}$ comprise wavelength tunable transmitters and wavelength tunable filters (not shown). The MAC modules$_{1-N}$ 160$_{1-N}$ are similar to the MAC module 110.

The TWDM PON 100 provides WDM capability by associating a downstream wavelength (e.g., $\lambda 1d, \lambda 2d, \ldots,$ and $\lambda nd$) and an upstream wavelength (e.g., $\lambda 1u, \lambda 2u, \ldots,$ and $\lambda nu$) with each OLT CT$_{1-M}$ 115$_{1-M}$ so that a plurality of wavelengths are present. The TWDM PON 100 then combines those wavelengths into a single optical fiber 137 and distributes the wavelengths to the ONUs 150 through the splitter 140. The TWDM PON 100 may provide TDM as well.

In conventional OFDM or DMT transmission systems, TSs are added to the payload symbols of a burst at a transmitter of each of the ONUs 150. The values in the TSs are known to both the transmitter of each of the ONUs 150 and the receiver of the OLT 105. Therefore, when the receiver of the OLT 105 receives the TSs, the OLT 105 may perform channel estimation for bursts transmitted on the link between the OLT 105 and each of the ONUs 150 by comparing the received TSs and the TSs that were expected to be received. By performing channel estimation, the OLT 105 may determine a channel response. The channel response indicates how the burst received from each of the ONUs 150 has been distorted by the link between the OLT 105 and each of the ONUs 150. The OLT 105 may then perform channel compensation based on the channel response.

In a typical PON implementing DMT, bursts include multiple TSs so that the OLT 105 can continuously use the TSs to perform channel estimation and determine a channel response. The more TSs included in a burst, the more accurate the channel response will be. However, the more TSs included in a burst, the more overhead involved in performing channel tracking, which includes performing channel estimation and channel compensation for the burst transmitted on a link between the OLT 105 and each of the ONUs 150.

Disclosed herein are embodiments that enable ONUs 150 to send fewer numbers of TSs in a burst and therefore, lowers the overhead involved for the OLT 105 when performing channel tracking for each of the ONUs 150. In an embodiment, the OLT 105 is configured to perform channel estimation for a link between the OLT 105 and one of the ONUs 150 to determine a channel response. The OLT 105 may be configured to store the channel response in a memory of the OLT 105. In an embodiment, the OLT 105 may use the stored channel response to perform channel compensation for each of the ONUs 150 using the stored channel response.

Figure 2:
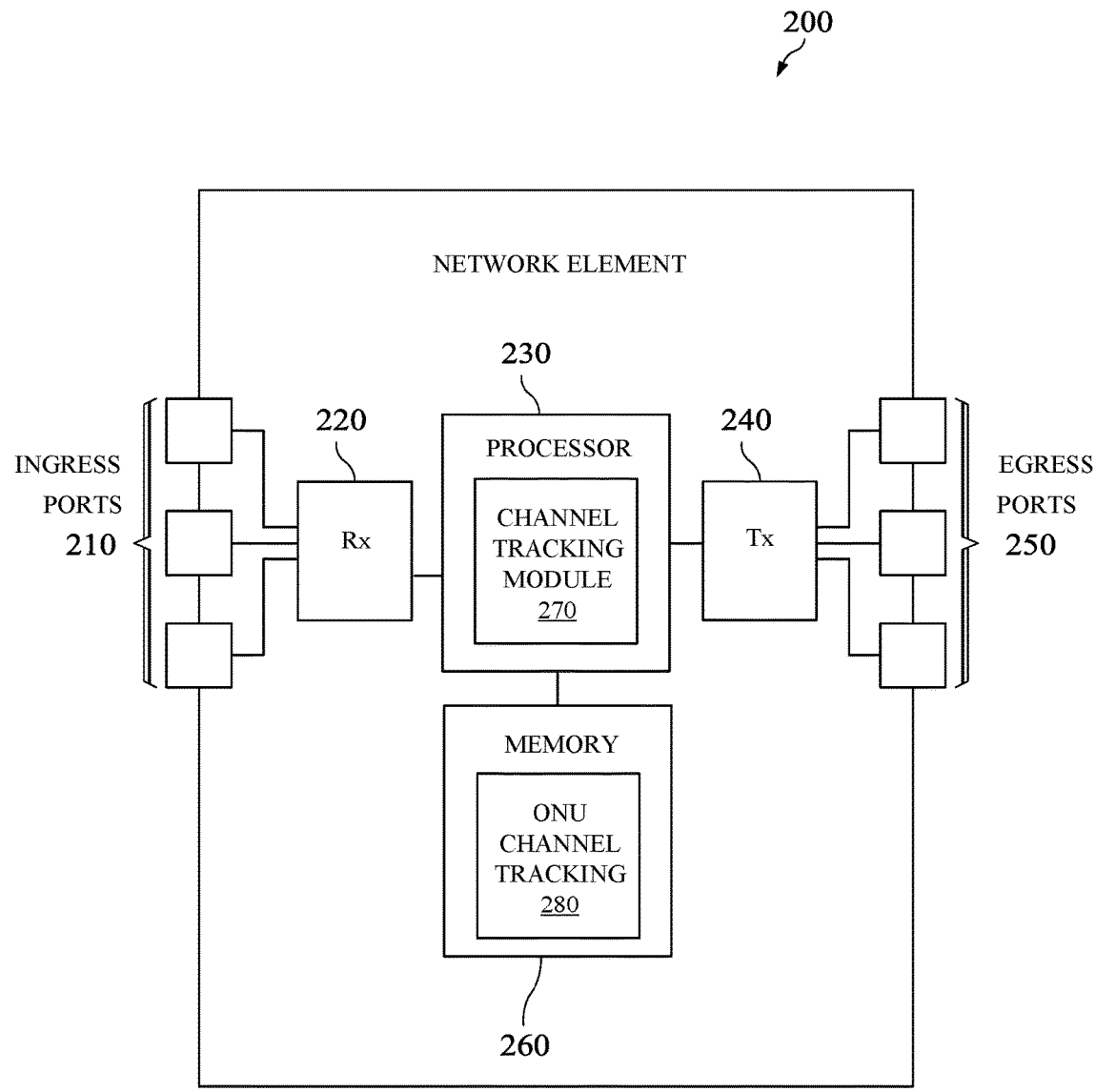
FIG. 2 is a schematic diagram of a NE.

FIG. 2 is a schematic diagram of a network element (NE) 200. The NE 200 is suitable for implementing the OLT 105, the ONU 150, or any other disclosed embodiments, including a device or system for implementing the message sequence diagram 500, and methods 600, 700, and 800. The NE 200 comprises ingress ports 210, a receiver unit (Rx) 220 coupled to the ingress ports 210 and configured for receiving data; a processor, logic unit, or central processing unit (CPU) 230 coupled to the Rx 220 and configured to process the data; a transmitter unit (Tx) 240 coupled to the processor 230, egress ports 250 coupled to the Tx 240 and configured for transmitting the data; and a memory 260 coupled to the processor 230 and configured for storing the data. The NE 200 may also comprise optical-to-electrical (OE) components and electrical-to-optical (EO) components coupled to the ingress ports 210, receiver units 220, transmitter units 240, and egress ports 250 for egress or ingress of optical or electrical signals.

The processor 230 may be implemented by hardware and software in some embodiments. The processor 230 may be implemented as one or more CPU chips, cores (e.g., as a multi-core processor), field-programmable gate arrays (FPGAs), application specific integrated circuits (ASICs), or digital signal processors (DSPs). The processor 230 is in communication with the ingress ports 210, receiver units 220, transmitter units 240, egress ports 250, and memory 260. The processor 230 comprises a channel tracking module 270 in some embodiments. The channel tracking module 270 performs at least part of the message sequence diagram 500, and methods 600, 700, and 800. The inclusion of the channel tracking module 270 therefore provides an improvement to the functionality of the NE 200. The channel tracking module 270 also effects a transformation of the NE 200 to a different state. Alternatively, the channel tracking module 270 is implemented as instructions stored in the memory 260 and executed by the processor 230.

The memory 260 comprises one or more disks, tape drives, and/or solid-state drives and may be used as an over-flow data storage device, to store programs when such programs are selected for execution, and/or to store instructions and data that are read during program execution. The memory 260 may be volatile or non-volatile and may be read-only memory (ROM), random-access memory (RAM), ternary content-addressable memory (TCAM), or static random-access memory (SRAM). The memory also comprises the ONU channel tracking 280, which may be a database storing the channel response information and estimated channel tracking features for each ONU that an OLT communicates with.

Further, the memory 260 may store one or more of a channel response, a current channel response, or a fine channel response in a frequency domain. The memory 260 may store one or more of a previously stored channel response or responses (or a plurality of previously received bursts), a weighted average of a plurality of previously received channel responses and the current channel response, a channel response comprising a weighted average between the current channel response and the previously stored channel response, or a stored channel response comprising a weighted average of a plurality of previous channel responses (where the plurality of previous channel responses are determined based on the plurality of bursts previously received from the ONU). The memory 260 may store one or more TSs. The memory 260 may store a phase slope difference between frequency-domain channel responses estimated by two TSs received from the second NE and based on a time duration between the two TSs. The memory 260 may store a burst payload or payloads. The memory 260 may store modulated symbols. The memory 260 may store a compensation value for compensating modulated symbols in a burst using the current channel response and the stored channel response. The memory 260 may store one or more of a clock frequency difference between a first NE and a second NE (or between the OLT and the ONU), or a compensation value for compensating a clock frequency difference between a first NE and a second NE (or between the OLT and the ONU). The memory 260 may store an interpolation routine for interpolating a clock frequency difference. The memory 260 may store a stored channel response including a clock frequency difference between the OLT and the ONU.

Figure 3:
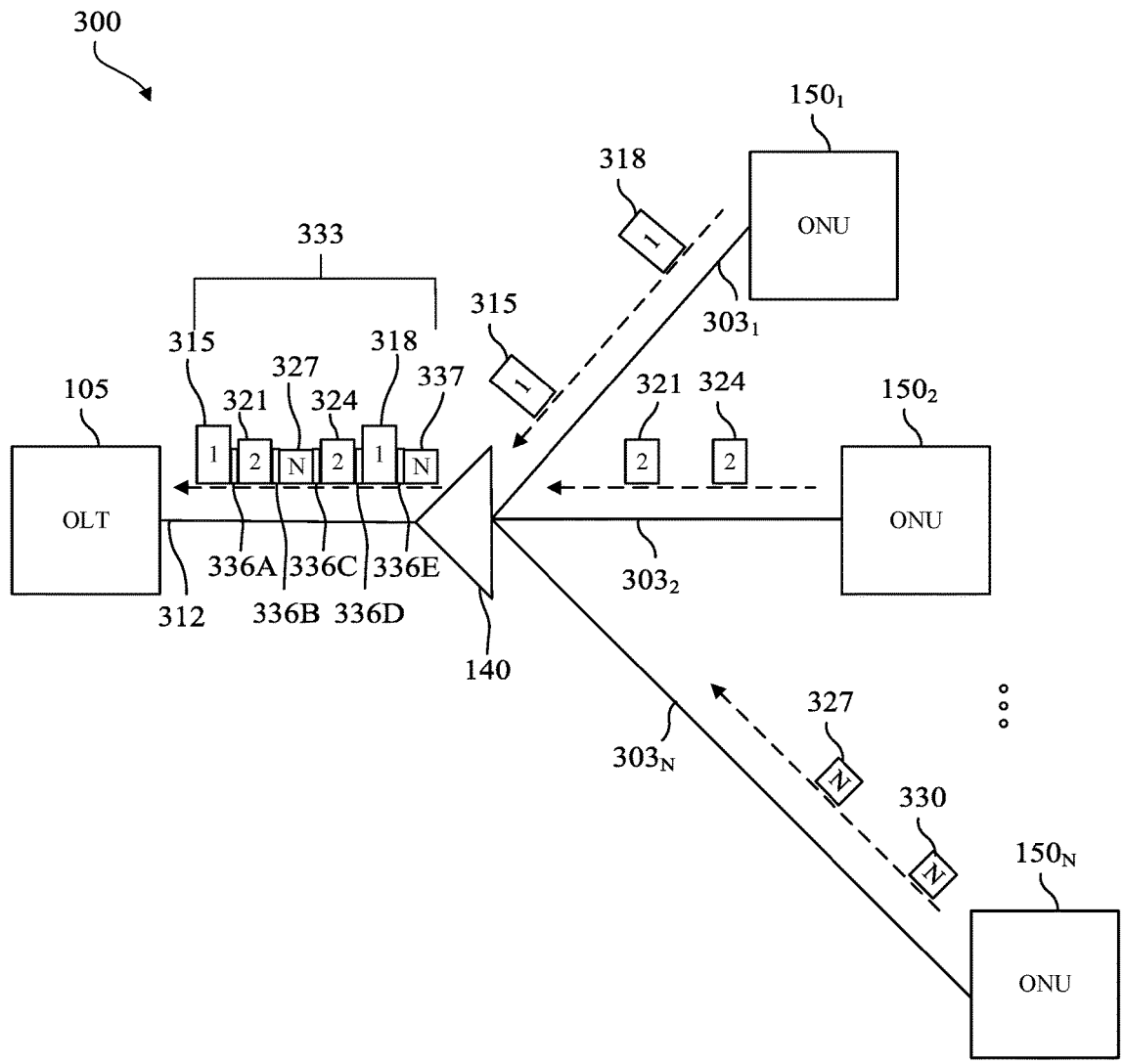
FIG. 3 is a schematic diagram of a TDM PON where embodiments of the present disclosure may operate.

FIG. 3 is a schematic diagram of a TDM PON 300 where embodiments of the present disclosure may operate. TDM PON 300 is similar to TWDM PON 100, except that only one wavelength is present in the system and the OLT 105 in TDM PON 300 is configured to perform ONU-dependent channel tracking using channel response information obtained during preceding bursts from the corresponding ONU. TDM PON 300 comprises ONUs$_{1-N}$, where N may be any positive integer. TDM PON 300 further comprises a splitter 140 and an OLT 105. ONU$_1$ 150$_1$ is coupled to the splitter 140 by the first drop fiber 303$_1$, ONU$_2$ 150$_2$ is coupled to the splitter 140 by the second drop fiber 303$_2$, and ONU$_N$ 150$_N$ is coupled to the splitter 140 by the Nth drop fiber 303$_N$. The splitter 140 is coupled to the OLT 105 by the feedback fiber 312. In an embodiment, the first drop fiber 303$_1$, the second drop fiber 303$_2$, the Nth drop fiber 303$_N$, and the feedback fiber 312 are single mode fibers. While only three ONUs, ONU$_1$ 150$_1$, ONU$_2$ 150$_2$, and ONU$_N$ 150$_N$ are shown in FIG. 3, it should be appreciated that any number of ONUs may be present in TDM PON 300.

Transmitters (e.g., Tx 240) of ONU$_1$ 150$_1$, ONU$_2$ 150$_2$, and ONU$_N$ 150$_N$ transmits signals via different optical fibers, fibers $303_{1-N}$, to the splitter 140. The splitter 140 is configured to combine the optical signals from $ONUs_{1-N}$ $150_{1-N}$ into a received signal 333 and forward the received signal 333 to the OLT 105. As shown in FIG. 3, a transmitter of $ONU_1$ $150_1$ sends bursts, such as the bursts 315 and 318, periodically via the first drop fiber $303_1$ to the OLT 105. The burst 315 and 318 are both labeled as "1" indicating that the burst 315 and 318 are sent from $ONU_1$ $150_1$. A transmitter of $ONU_2$ $150_2$ sends bursts, such as burst 321 and 324, periodically via the second drop fiber $303_2$ to the OLT 105. The burst 321 and 324 are both labeled as "2" indicating that the burst 321 and 324 are sent from $ONU_2$ $150_2$. A transmitter of $ONU_N$ $150_N$ sends bursts, such as the bursts 327 and 330, periodically via the $N^{th}$ drop fiber $303_N$ to the OLT 105. The burst 327 and 330 are both labeled as "N" indicating that the burst 327 and 330 are sent from $ONU_N$ $150_N$.

The bursts 315, 318, 321, 324, 327, and 330 may be rapid "bursts" comprising one or more segments of an upstream signal sent from an ONU to an OLT in quick succession. The splitter 140 combines the bursts 315, 318, 321, 324, 327, and 330 into one received signal 333. In an embodiment, the bursts 315, 318, 321, 324, 327, and 330 may be separated by guard intervals 336A-E, or time intervals, to allow for the OLT 105 receiver (e.g., Rx 220) to distinguish between each of the bursts 315, 318, 321, 324, 327, and 330. The physical heights of the bursts 315, 318, 321, 324, 327, and 330 in the received signal 333 (as portrayed in FIG. 3) indicate the optical powers of these signals, which are determined by the corresponding transmitter powers of the respective ONUs and fiber link losses. For example, $ONU_1$ $150_1$ is closest to the splitter 140 and OLT 105 and thus, bursts 315 and 318 experience the least fiber induced loss and thus have the tallest height or a greatest optical power. $ONU_N$ $150_N$ is farthest from the splitter 140 and OLT 105 and thus, bursts 327 and 330 experiences the greatest fiber induced loss and thus have the shortest height or a lowest optical power.

In an embodiment, each of the bursts 315, 318, 321, 324, 327, and 330 from each of the $ONU_1$ $150_1$, $ONU_2$ $150_2$, and $ONU_N$ $150_N$ include TSs, the content of which is used by the OLT 105 to perform channel estimation and determine a channel response for the ONU sending the burst. For example, $ONU_1$ $150_1$ sends burst 315 to OLT 105. The burst 315 may include a TS before the payload and a TS after the payload. The TSs include values that are known to both the OLT 105 and the $ONU_1$ $150_1$. After the OLT 105 receives the burst 315, the OLT 105 compares the expected TSs to the actually received TSs to determine a channel response for the burst 315 transmitted on the link connecting $ONU_1$ $150_1$ and OLT 105. The link connecting $ONU_1$ $150_1$ and OLT 105 includes the first drop fiber $303_1$ and the feedback fiber 312. The channel response may indicate how the burst 315 is distorted while transmitting from $ONU_1$ $150_1$ to OLT 105. The OLT 105 is then configured to perform channel compensation, or undo the distortion to burst 315, based on the channel response. In an embodiment, the OLT 105 is configured to store the channel response for burst 315 in a memory (e.g., memory 260) as a stored channel response.

After a period of time $ONU_1$ $150_1$ sends burst 318 to OLT 105. Burst 318 need not include two TSs since a stored channel response for the link connecting $ONU_1$ $150_1$ and OLT 105 is already stored at the OLT 105 from previous burst 315. For example, burst 318 may include one TS at the beginning of the payload. In an embodiment, OLT 105 may determine a channel response based on the one TS in burst 318. Typically more TSs are needed in a burst to perform channel estimation and determine a channel response. However, the embodiments disclosed herein enable a faster mechanism of performing channel estimating by using the channel response based on the one TS in burst 318 with the stored channel response. The OLT 105 may then perform channel compensation for the channel faster using a weighting of the stored channel response and the channel response based on the one TS in the burst.

According to some embodiments, the OLT 105 is configured to perform ONU-dependent channel tracking using the channel response obtained in preceding (or previous) bursts received from each of the $ONUs_{1-N}$ $150_{1-N}$ to perform channel compensation for a current burst for the same ONU. The OLT is configured to perform channel compensation operations, such as, but not limited to, t-sync, f-sync, initial clock phase offset compensation, and other channel compensation operations on each of the bursts received from each $ONUs_{1-N}$ $150_{1-N}$. Note that channel compensation may be realized by imposing an inverse of the weighting of the stored channel response and the channel response onto a received symbol.

Figure 4A:
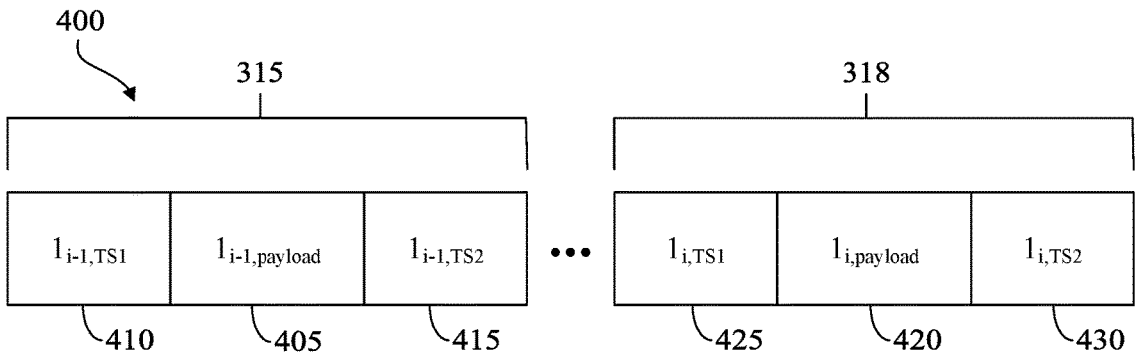
FIGS. 4A, 4B, and 4C are packet diagrams of bursts sent from ONUs to an OLT.
Figure 4B:
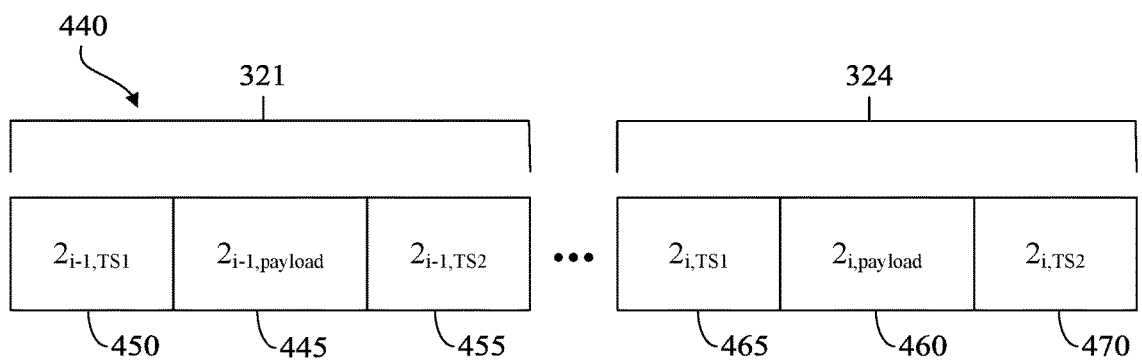
Figure 4C:
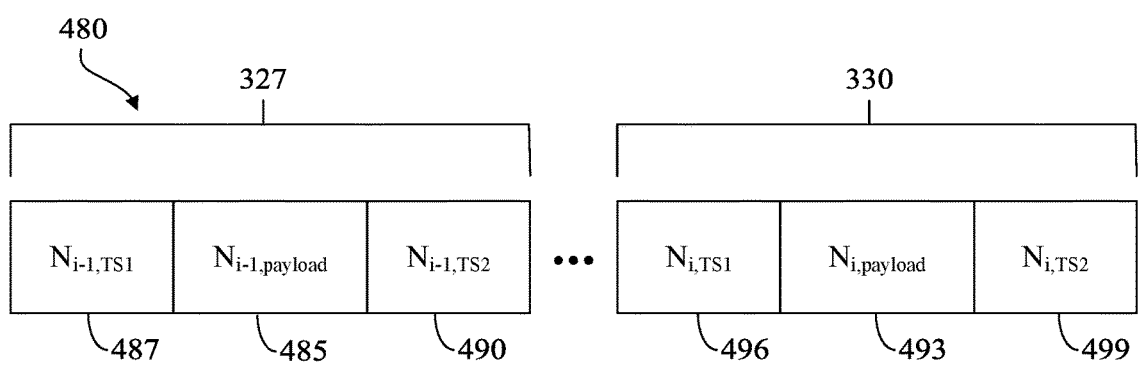

FIGS. 4A, 4B, and 4C are packet diagrams of bursts sent from $ONUs_{1-N}$ $150_{1-N}$ to an OLT 105. FIG. 4A illustrates the set of bursts 400 sent by $ONU_1$ $150_1$ to OLT 105. The set of bursts 400 includes burst 315 and 318. In the embodiment, shown in FIG. 4A, burst 315 is an $i-1^{th}$ burst, or a previous burst, and burst 318 is an $i^{th}$ burst, or a current burst. As shown in FIG. 4A, $ONU_1$ $150_1$ inserts a first TS (TS1) 410 at the beginning of the payload 405 and a second TS (TS2) 415 at the end of the payload 405 for burst 315. Similarly, the $ONU_1$ $150_1$ inserts a first TS (TS1) 425 at the beginning of the payload 420 and a second TS (TS2) 430 at the end of the payload 420 for burst 318. In an embodiment, $ONU_1$ $150_1$ transmits burst 315 at a first time to OLT 105 and then transmits burst 318 at a second time to OLT 105. In an embodiment, the second time is a period of time after the first time. In an embodiment, the bursts 315 and 318 may be sent according to a burst period or when requested by a Media Access Control (MAC) element.

In an embodiment, OLT 105 is configured to first receive the burst 315 and determine a channel response based on the first TS1 410 and the second TS2 415 of burst 315. In an embodiment, OLT 105 is configured to store the channel response in a memory of the OLT 105 as a stored channel response. When $ONU_1$ $150_1$ transmits burst 318 to OLT 105, OLT 105 already has the stored channel response stored for a link between $ONU_1$ $150_1$ and OLT 105 based on burst 315. In an embodiment, the OLT 105 is configured to determine a channel response based on the first TS1 425 and/or the second TS2 430 of burst 318. For example, the OLT 105 may be configured to use only the first TS1 425 to determine the channel response for the burst 318. In this example, less overhead is needed since fewer TSs are needed in a burst to perform channel compensation. The OLT 105 may then perform channel compensation for the burst 318 transmitted on the link between $ONU_1$ $150_1$ and OLT 105 based on a weighting of the stored channel response and on the channel response. Therefore according to various embodiments, the OLT 105 more accurately and efficiently performs channel compensation for the burst 318 based on the stored channel response from burst 315 and the channel response based on the first TS1 425 and/or the second TS2 430. Storing channel responses that are determined from previous bursts and then using the stored channel responses to perform channel compensation provides for more accurate and efficient channel compensation.

FIG. 4B illustrates the set of bursts 440 sent by $ONU_2$ $150_2$ to OLT 105. The set of bursts 440 includes burst 321 and 324. In the embodiment, shown in FIG. 4B, burst 321 is an $i-1^{th}$ burst, or a previous burst, and burst 324 is an $i^{th}$ burst, or a current burst. As shown in FIG. 4B, $ONU_2$ $150_2$ inserts a first TS (TS1) 450 at the beginning of the payload 445 and a second TS (TS2) 455 at the end of the payload 445 for burst 321. Similarly, the $ONU_2$ $150_2$ inserts a first TS (TS1) 465 at the beginning of the payload 460 and a second TS (TS2) 470 at the end of the payload 460 for burst 324. In an embodiment, $ONU_2$ $150_2$ transmits burst 321 at a first time to OLT 105 and then transmits burst 324 at a second time to OLT 105. In an embodiment, the OLT 105 is configured to determine a channel response based on the first TS1 450 and the second TS2 455. In an embodiment, OLT 105 is configured to store the channel response in a memory of the OLT 105 as a stored channel response. When $ONU_2$ $150_2$ transmits burst 321 to OLT 105, OLT 105 already has a channel response stored for a link between $ONU_2$ $150_2$ and OLT 105. In an embodiment, the OLT 105 can perform channel compensation for the link between $ONU_2$ $150_2$ and OLT 105 based on the stored channel response. For the burst 324, the OLT 105 is configured to determine a channel response based on the first TS1 465 and/or the second TS2 470. In an embodiment, the OLT 105 more accurately and efficiently performs channel compensation for the link between $ONU_2$ $150_2$ and OLT 105 by using the stored channel response from the previous burst 321 and the channel response based on the current burst 324.

FIG. 4C illustrates the set of bursts 480 sent by $ONU_N$ $150_N$ to OLT 105. The set of bursts 480 includes burst 327 and 330. In the embodiment, shown in FIG. 4C, burst 327 is an $i-1^{th}$ burst, or a previous burst, and burst 330 is an $i^{th}$ burst, or a current burst. As shown in FIG. 4C, $ONU_N$ $150_N$ inserts a first TS (TS1) 487 at the beginning of the payload 485 and a second TS (TS2) 490 at the end of the payload 485 for burst 327. Similarly, the $ONU_N$ $150_N$ inserts a first TS (TS1) 496 at the beginning of the payload 493 and a second TS (TS2) 499 at the end of the payload 493 for burst 330. In an embodiment, $ONU_N$ $150_N$ transmits burst 327 at a first time to OLT 105 and then transmits burst 330 at a second time to OLT 105. In an embodiment, the OLT 105 is configured to determine a channel response based on the first TS1 487 and the second TS2 490. In an embodiment, OLT 105 is configured to store the channel response in a memory of the OLT 105 as a stored channel response. When $ONU_N$ $150_N$ transmits burst 330 to OLT 105, OLT 105 already has a stored channel response stored for a link between $ONU_N$ $150_N$ and OLT 105. In an embodiment, the OLT 105 can perform channel compensation for the link between $ONU_N$ $150_N$ and OLT 105 based on the stored channel response. For the burst 330, the OLT 105 is configured to determine a channel response based on the first TS1 496 and/or the second TS2 499. In an embodiment, the OLT 105 more accurately and efficiently performs channel compensation for the link between $ONU_N$ $150_N$ and OLT 105 by using the stored channel response from previous burst 327 and the channel response based on the current burst 330.

In an embodiment, the contents of TSs 410, 415, 425, 430, 450, 455, 455, 465, 470, 487, 490, 496, and 499 may be the same or different, so long as the OLT 105 can use the contents of TS 410, 415, 425, 430, 450, 455, 455, 465, 470, 487, 490, 496, and 499 to perform channel estimation and channel compensation for each of $ONUs_{1-N}$ $150_{1-N}$. The TSs may be particular OFDM or DMT symbols whose subcarriers are modulated with known pseudo-random bit sequences (PRBSs). In an embodiment, the TSs inserted at the beginning of the payloads and the TSs inserted at the end of the payloads may be different to more accurately probe (or measure) the channel response. Estimation of the channel response or performance of channel tracking is dependent on the content of the TSs. By varying the TSs, the OLT is able to more accurately estimate the channel response and/or perform channel compensation. In this way, if one TS is contaminated (e.g., due to its high peak-to-average-power ratio), having a second TS with content that is different than the first TS will help ensure that the OLT 105 has more accurate and reliable information to estimate the channel response and/or perform channel tracking.

In another embodiment, more than two different TSs may be used for a given $ONU_{1-N}$ $150_{1-N}$ to better probe the channel to achieve better channel estimation and compensation. In yet another embodiment, the TSs used for different ONUs may be different to provide additional identification of the each burst. The additional information may assist functions such as channel bonding in TWDM-PON.

According to various embodiments, the OLT 105 receives a combined received signal, via the splitter 140, including all of the TSs 410, 415, 425, 430, 450, 455, 455, 465, 470, 487, 490, 496, and 499 and payloads from all the $ONUs_{1-N}$ $150_{1-N}$. The OLT 105 is configured to demultiplex the combined received signal into the separate payloads and the TSs received from each of $ONUs_{1-N}$ $150_{1-N}$. The OLT 105 may be configured to use the content of the TSs received from each of the $ONUs_{1-N}$ $150_{1-N}$ to perform channel compensation for each of the $ONUs_{1-N}$ $150_{1-N}$, such as, but not limited to, t-sync, f-sync, and initial clock phase offset compensation. In an embodiment, the channel tracking module 270 is configured to perform channel tracking for each of the $ONUs_{1-N}$ $150_{1-N}$ based on the content of the TSs received from the same ONU 150. In an embodiment, channel tracking refers to determining a channel response, storing the channel response as a stored channel response, updating the stored channel response, and/or performing channel compensation using the stored and channel response. The OLT 105 may also be configured to store the channel response for each of the $ONUs_{1-N}$ $150_{1-N}$ after performing the channel tracking for each of the $ONUs_{1-N}$ $150_{1-N}$. For example, the OLT 105 may be configured to store the channel response information for each of the $ONUs_{1-N}$ $150_{1-N}$ in association with an ONU identifier in the ONU channel tracking 280 in a memory 260.

Figure 5:
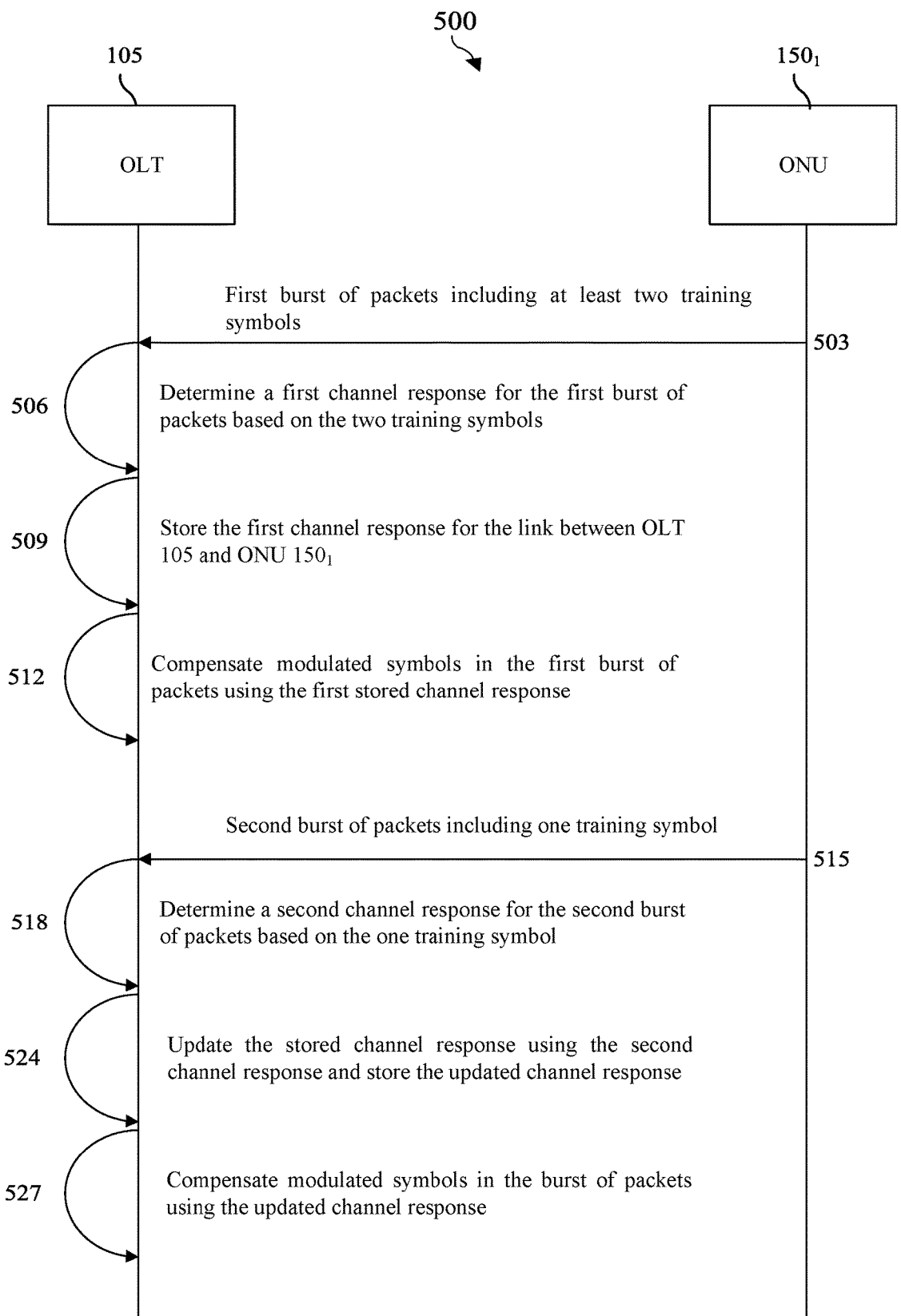
FIG. 5 is a message sequence diagram implemented by an OLT and an ONU.

FIG. 5 is a message sequence diagram 500 implemented by an OLT 105 and an ONU 150. In an embodiment, the OLT 105 and ONU 150 are components in the TWDM PON 100 or the TDM PON 300. Message sequence diagram 500 is implemented when an ONU 150 begins to send bursts periodically to an OLT 105. At step 503, ONU 150 sends a first burst to the OLT 105. In an embodiment, a Tx 240 of the ONU 150 sends the first burst to the OLT 105. For example, the first burst may be similar to the burst 315. The first burst may include two TSs. For example, a first TS is inserted before the payload and a second TS is inserted after the payload, as shown in FIG. 4A.

At step 506, the OLT 105 is configured to determine a first channel response for the first burst transmitted on the link between the OLT 105 and ONU 150 based on the two TSs. For example, a Rx 220 of the OLT 105 receives the first burst from the ONU 150, and a processor 230 is configured to determine a first channel response for the first burst based on the two TSs. At step 509, the OLT 105 stores the first channel response in a memory of the OLT 105. For example, the first channel response for the link between the OLT 105 and ONU 150 is stored in the ONU channel tracking 280 of the memory 260 as a first stored channel response. In an embodiment, the first channel response may be stored in association with an identifier of the ONU sending first the burst. The first channel response/first stored channel response may be the first channel response stored for the link between OLT 105 and ONU 150, and may be used to enhance channel tracking and compensation mechanisms performed for subsequent bursts.

At step 512, the OLT 105 is configured to perform compensation on modulated symbols in the first burst received from ONU 150. In an embodiment, the processor 230 performs compensation on the modulated symbols in the first burst received from ONU 150. In an embodiment, the OLT 105 removes a distortion of the modulated symbols in the first burst based on the distortion identified by the first stored channel response.

At step 515, ONU 150 sends a second burst to the OLT 105. In an embodiment, a Tx 240 of the ONU 150 sends the second burst to the OLT 105. For example, the second burst may be similar to the burst 218, except that the second burst may include only one TS. For example, a first TS is inserted before the payload.

At step 518, the OLT 105 is configured to determine a second channel response for the second burst transmitted on the link between the OLT 105 and ONU 150 based on the TS in the second burst. For example, a Rx 220 of the OLT 105 receives the second burst from the ONU 150, and a processor 230 is configured to determine a second channel response for the second burst transmitted on the link between the OLT 105 and ONU 150 based on the TS in the second burst. The OLT 105 may determine a channel response for the second burst using the one TS since the first stored channel response based on previous TSs is available. Therefore, the reduction in number of TSs sent in a burst also reduces the overhead in the system.

At step 524, the OLT 105 is configured to update the stored channel response using the second channel response and store the updated channel response. For example, the channel tracking module 270 is configured to update the stored channel response using the second channel response, and the updated channel response is stored in the ONU channel tracking 280 of the memory 260 in association with an identifier of the ONU 150. In an embodiment, the stored channel response is updated using the second channel response by assigning a first coefficient to the stored channel response and a second coefficient to the second channel response. In an embodiment, the stored channel response is updated according to the following averaging equation (1):

$$R_{updated,N} = (1-a_n)R_{past,N} + (a_n)R_{current,N} \quad (1)$$

where $R_{updated,N}$ is the updated channel response for the Nth ONU, $R_{past,N}$ is the stored channel response for the Nth ONU, and $R_{current,N}$ is the second channel response for the Nth ONU. Coefficient $a_n$ is the forgetting factor of the Nth ONU. That is, the higher the forgetting factor is, the more weight that is given to the channel responses calculated from the previous bursts from the Nth ONU. In an embodiment, the forgetting factor may be between about 0.005 and 0.2. Therefore, according to some embodiments, the channel response calculated and stored based on previous bursts is more important for channel compensation purposes than a currently computed channel response.

At step 527, the OLT 105 is configured to perform compensation on modulated symbols in the second burst received from ONU 150 based on the updated channel response. In an embodiment, the processor 230 performs compensation on the modulated symbols in the second burst received from ONU 150 based on the updated channel response. In an embodiment, the OLT 105 removes a distortion of the modulated symbols in the first burst based on the distortion identified by the updated channel response. In an embodiment, the processor 230 is also configured to compensate a clock frequency difference between the OLT and the ONU.

According to some embodiments, the channel compensation performed in step 527 using the stored channel response determined using previous bursts from the same ONU 150 is more accurate and efficient than the channel compensation performed in step 512. This is because in step 527, the use of the stored channel response and fewer TSs from the second burst results in an increased channel tracking speed at the OLT 105. This thereby results in a lower processing latency, lower processing complexity, and enabling the use of short upstream bursts efficiently. After several iterations of updating the stored channel response from ONU 150, the stored channel response will reflect a very accurate and average channel response for the link between OLT 105 and ONU 150. Therefore, the OLT 105 will have better receiver sensitivity, better link budget, and enable the use of low-cost components with substantially varying frequency response.

Figure 6:
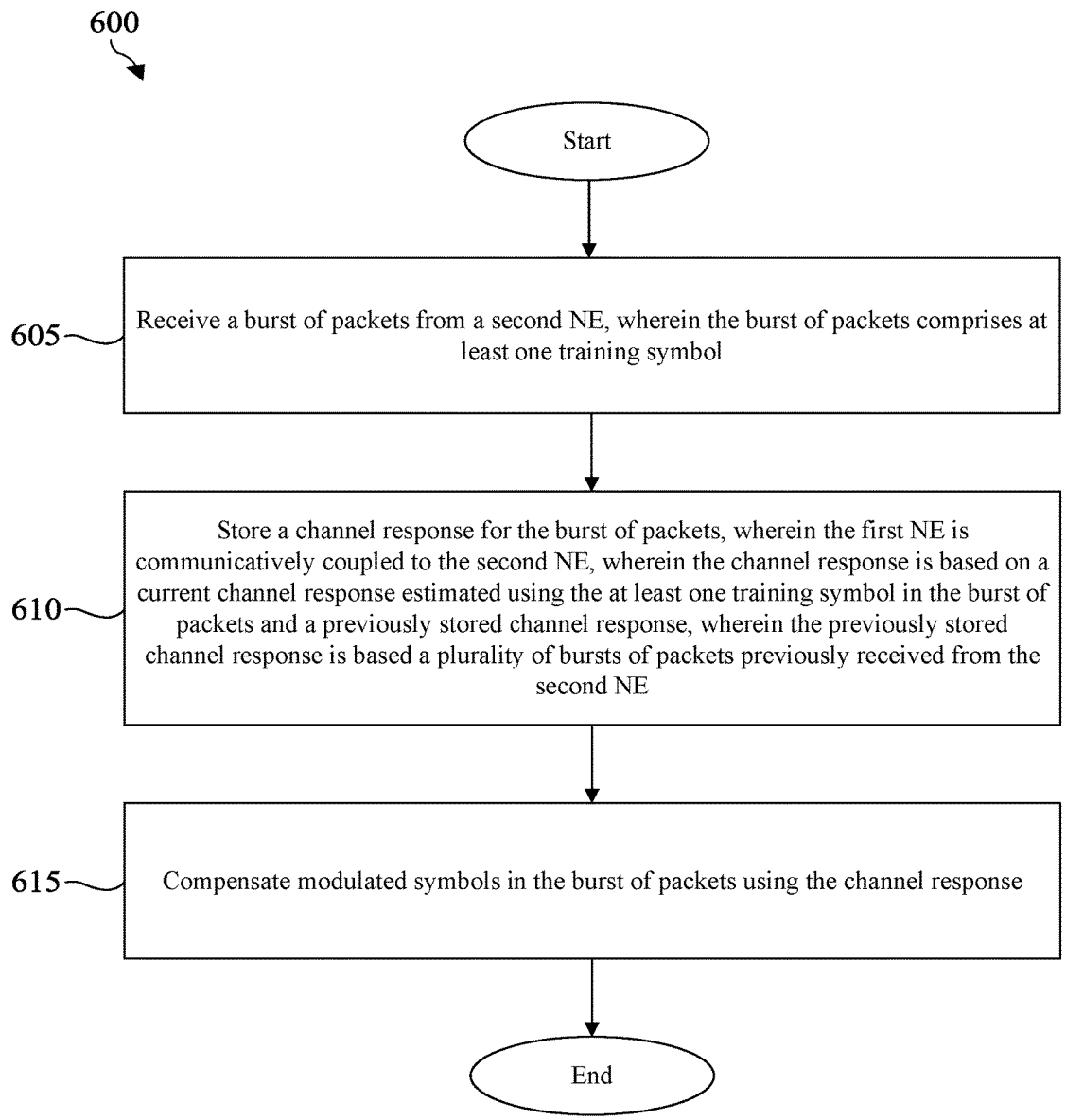
FIG. 6 is a flowchart illustrating a method of ONU-dependent channel storing according to an embodiment of the disclosure.

FIG. 6 is a flowchart illustrating a method 600 of ONU-dependent channel storing according to an embodiment of the disclosure. For example, the method 600 may be implemented by a first NE. In an embodiment, the first NE may be an OLT 105. In an embodiment, the method 600 may be implemented by channel tracking module 270 when TSs are received in a payload from a second NE. In an embodiment, the second NE may be one of the ONUs 150. While the method 600 is described as being executed by an OLT 105, it should be appreciated that any NE, such as a router or switch, that is passive and does not move locations, may execute the steps of method 600.

At block 605, a burst is received from one or more ONUs. For example, the Rx 220 receives the burst from a second NE. In an embodiment, the second NE may be one of the ONUs 150. In an embodiment, each of the bursts comprises a TS. For example, a TS may be inserted on either end of the payload, as described in FIGS. 4A-C. When the first NE does not store a channel response for a link between the first NE and the second NE, more than one TS may be used in the burst to determine a channel response for the burst.

In an embodiment, a channel response is determined for the burst transmitted via the link between the first NE and the second NE based on the content of the received TSs in the first burst. TSs are symbols known to both the first NE and the second NE, and thus the received TSs can be compared to the known or expected TS to identify signal distortion. For example, the TSs can be used to determine when a signal is distorted because of optical transmission impairments, such as chromatic dispersion and polarization mode dispersion. In an embodiment, the first NE compares the TSs in the first burst with the expected TSs. In an embodiment, the processor 230 is configured to determine a channel response for the second NE based on the TSs.

In an embodiment, the channel response comprises a clock frequency difference and a fine frequency response. In an embodiment, the processor 230 is also configured to compensate a clock frequency difference between the OLT and the ONU (i.e., first and second NEs). The clock frequency difference is a clock frequency difference between the second NE transmitter (Tx 240) and the first NE receiver (Rx 220). The clock frequency difference may be estimated by two TSs, respectively, located at the beginning and end of the burst, as described in FIGS. 4A-C. In an embodiment, the clock frequency difference between a first NE transmitter and a second NE receiver is determined by comparing a phase slope difference between frequency-domain associated channel responses estimated by the TSs in the previous bursts from the second NE, with the consideration of the time duration between these two TSs. Note that these TSs may reside in the same burst, or reside in different bursts originated from the second NE. In an embodiment, the clock frequency difference is stored or updated as part of the stored channel response in ONU channel tracking 280 in a memory 260 of the first NE.

In an embodiment, the channel response includes the fine frequency response in the absence of clock/phase offset. The TSs that are transmitted through the links between the first NE and the second NE experience power losses. Hence, the TSs may be contaminated by noise upon amplification and/or photo-detection. Therefore, averaging the channel responses estimated by multiple TSs may provide a more accurate and reliable estimate of the channel response for a link. In an embodiment, the fine frequency response may be estimated by averaging in an intra-symbol frequency domain over a small number of subcarriers. In an embodiment, the fine frequency response may be estimated by averaging in an inter-symbol frequency domain (using multiple TSs in multiple preceding bursts) on a per-subcarrier basis. The fine frequency response may thus be as fine as the channel response at each subcarrier frequency of the OFDM or DMT signal for each ONU. With accurate per-subcarrier based channel estimation, the fast Fourier transform (FFT) and IFFT used may be small, and a low processing latency, low processing complexity, and low processing power may be achieved.

At block 610, the channel response for the burst transmitted over the link between the first NE and the second NE is stored at a memory of the first NE, wherein the channel response is based on the at least one TS in the burst and a stored channel response, and wherein a stored previous channel response is based on a plurality of bursts previously received from the NE. For example, the channel response for the link between the first NE and the second NE is stored at the ONU channel tracking 280 of memory 260 in association with an identifier of the second NE. In an embodiment, the storing of the channel response for the link between the first NE and the second NE comprises updating a stored channel response based on the TSs in the burst. For example, the stored channel responses are updated by a weighted average of the previously stored channel response and the channel response obtained from the burst in step 605. In an embodiment, the stored channel responses may be dynamically updated upon receiving more bursts from the second NE such that the first NE receiver dynamically adapts to the channel conditions. The dynamic updating process may be based on a weighted average of the previously stored channel response and the channel response obtained in the current burst, as described in equation (1) above. At block 615, modulated symbols in the burst are compensated for based on the stored channel response stored at the first NE. In an embodiment, the processor 230 performs compensation on the modulated symbols in the burst received from the second NE.

Figure 7:
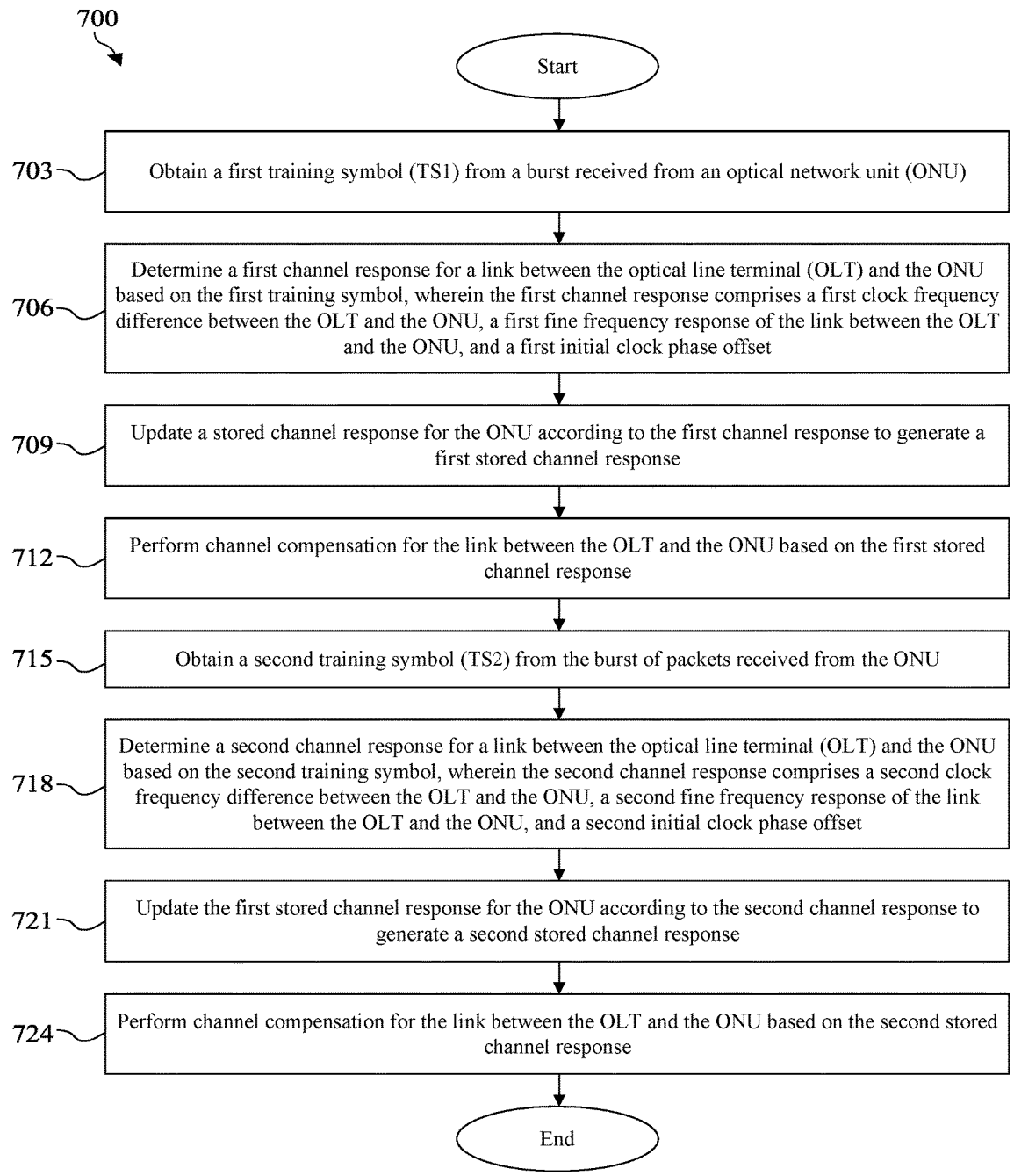
FIG. 7 is a flowchart illustrating a method of ONU-dependent channel tracking according to an embodiment of the disclosure.

FIG. 7 is a flowchart illustrating a method 700 of ONU-dependent channel tracking according to an embodiment of the disclosure. For example, the method 700 may be implemented by the OLT 105. In an embodiment, the method 700 may be implemented when packet bursts are received from ONUs. At block 703, a first TS of a burst received from an ONU is obtained. For example, the Rx 220 receives the first TS1 of a burst originated from a given one of ONUs 150. At block 706, a first channel response for the burst transmitted on a link between the ONU and the OLT based on the first TS is determined. For example, the processor 230 determines a first channel response for a link between the OLT and the ONU based on the first TS. In an embodiment, the first channel response comprises a first clock frequency difference between the OLT and the ONU, a first fine frequency response of the link between the OLT and the ONU, and a first initial clock phase offset. In an embodiment, an initial clock phase offset is determined based on the comparison between the received first TS and the expected first TS, which is known to the receiver. In an embodiment, channel estimation based on the first TS is conducted to find the initial clock phase offset and the first fine frequency response. Channel estimation based on TSs may be performed according to the methods disclosed in "Intra-symbol frequency-domain averaging based channel estimation for coherent optical OFDM," by Xiang Liu and Fred Buchali, dated Dec. 22, 2008, which is hereby incorporated by reference in its entirety.

At block 709, a stored channel response for the ONU is updated according to the first channel response to generate an updated channel response. For example, a stored channel response comprising channel response information regarding a link between the OLT and the ONU is stored at ONU channel tracking 280 in a memory 260 in association with an identifier of the ONU. The stored channel response may be updated based on the first channel response according to the weighting equation defined in equation (1). Updating the stored channel response to consider the first channel response generates the updated stored channel response. For example, a stored clock frequency difference between the OLT and the ONU, a stored fine frequency response of the link between the OLT and the ONU, and a stored initial clock phase offset are each updated based on equation (1) to update the first clock frequency difference between the OLT and the ONU, the first fine frequency response of the link between the OLT and the ONU, and the first initial clock phase offset.

At block 712, channel compensation for the link between the OLT and the ONU (i.e., first and second NEs) is performed based on the first stored channel response. For example, the channel tracking module 270 executed by the processor 230 performs channel compensation for the link between the OLT and the ONU based on the first stored channel response. In an embodiment, compensation is performed on the modulated symbols in the burst using the stored channel response. For example, compensation on the modulated symbols in the burst may be performed according to the methods disclosed in "Intra-symbol frequency-domain averaging based channel estimation for coherent optical OFDM," by Xiang Liu and Fred Buchali, dated Dec. 22, 2008, which is incorporated by reference in its entirety above. For example, performing compensation on the modulated symbols of the burst comprises performing t-sync and f-sync on the modulated symbols. In an embodiment, for each of the payload OFDM or DMT symbols, compensation of the initial clock phase offset is performed, compensation of the clock phase drift based on the stored clock frequency difference between the ONU and the OLT (i.e., first and second NEs) using interpolation is performed, and compensation of the fine channel response based on the stored fine channel response is performed.

In an embodiment, the clock frequency difference is calculated based on the first TS of the current burst by interpolating the previous clock frequency differences stored for the ONU sending the current burst. The clock frequency difference between each ONU and the OLT can be interpolated over time to provide a gradual change in the phase slope in the frequency-domain channel response of the OLT. By interpolating the clock frequency difference computed for the current burst into the stored clock frequency difference, clock frequency/phase offsets of all the OFDM and/or DMT symbols are better compensated in the same burst because only the first TS has to be examined. There is no need to wait for the second TSs or the other payload symbols to update the clock frequency difference. The receiver of the OLT is adjusted after the first TS without having to wait to receive a second TS. The embodiments disclosed herein provide for a much faster method of channel compensation. Similarly, the compensation of the fine channel response is performed based on the stored fine channel response such that fast and accurate channel compensation is achieved for each payload symbol.

At block 715, a second TS of a burst received from an ONU is obtained. For example, Rx 220 receives the second TS in the burst for channel estimation. At block 718, a second channel response for a link between the OLT and the ONU based on the second TS is determined. For example, processor 230 determines the second channel response for the burst. In an embodiment, the second channel response comprises a second clock frequency difference between the OLT and the ONU, a second fine frequency response of the link between the OLT and the ONU, and a second initial clock phase offset. In an embodiment, the second clock frequency difference is obtained based on channel estimation results from the first TS and the second TS. In addition, the second fine frequency response (in the absence of clock/phase offset) is obtained based on the second TS. For example, processor 230 obtains the clock frequency difference based on channel estimation results from the first TS and the second TS. The processor 230 may also obtain the second fine frequency response (in the absence of clock/phase offset) based on the second TS.

At block 721, the first stored channel response for the ONU is updated according to the second channel response to generate a second stored channel response. For example, the first stored channel response comprising the channel response information (regarding a link between the OLT and the ONU) is stored in memory 260 in association with an identifier of the ONU. The first stored channel response may be updated based on the second channel response according to the weighting equation defined in equation (1). Updating the first stored channel response to consider the second channel response generates the second stored channel response. In an embodiment, the first stored channel response information that includes the clock frequency difference and the first fine frequency response (in the absence of clock/phase offset), is updated using the weighted averaging described in Eq. (1). The stored channel responses are used to aid in channel equalization of the next burst from the same ONU.

At block 724, channel compensation for the link between the OLT and the ONU is performed based on the second stored channel response. For example, the channel tracking module 270 executed by the processor 230 performs channel compensation for the link between the OLT and the ONU based on the second stored channel response. In an embodiment, compensation is performed on the modulated symbols in the burst using the first stored channel response. For example, performing compensation on the modulated symbols of the burst comprises performing t-sync and f-sync on the modulated symbols. In an embodiment, for each of the payload OFDM or DMT symbols, compensation of the initial clock phase offset is performed, compensation of the clock phase drift based on the stored clock frequency difference between the ONU and the OLT using interpolation is performed, and compensation of the fine channel response based on the stored fine channel response is performed. The above described methods 600 and 700 continue such that following bursts from the each ONU are adaptively and accurately equalized.

Figure 8:
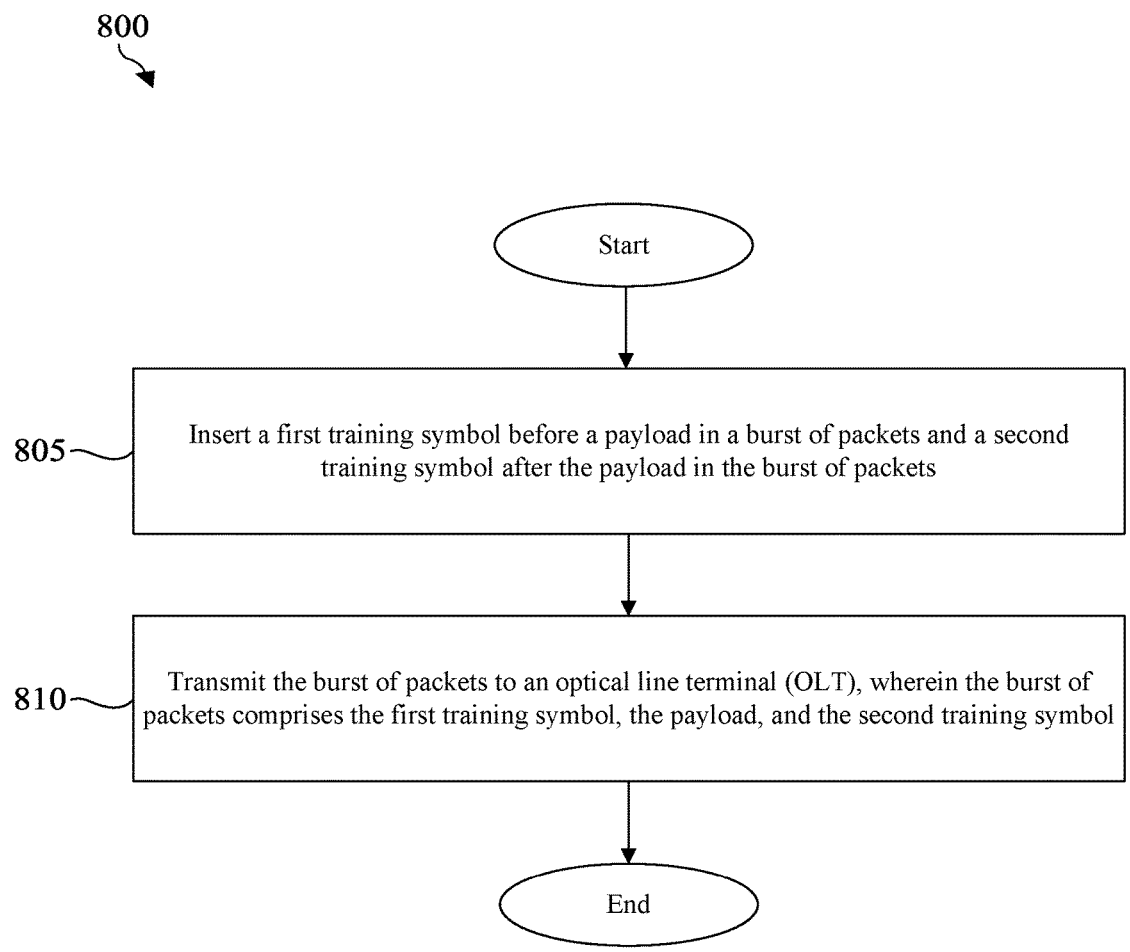
FIG. 8 is a flowchart illustrating a method of ONU-dependent channel tracking according to an embodiment of the disclosure.

FIG. 8 is a flowchart illustrating a method 800 of ONU-dependent channel tracking. The method 800 may be implemented by ONUs 150. In an embodiment, the method 800 may be implemented by channel tracking module 270 when packet bursts are ready to be sent to the OLT 105. At block 805, a first TS is inserted before a payload in a burst and a second TS is inserted after the payload in the burst. For example, processor 230 inserts a first TS before a payload in a burst and a second TS after the payload in the burst, as shown in FIGS. 4A-C. At block 810, the burst is transmitted to the OLT. For example, Tx 240 transmits the burst to the OLT. In an embodiment, the burst comprises the first TS, the payload, and the second TS. According to some embodiments, the OLT stores a channel response for the ONU sending the burst. Therefore, fewer TSs need to be included while sending a burst for the OLT to compensate for any distortion in the signal.

DMT may be used to achieve 25 gigabits per second (Gb/s) transmission with 10 gigahertz (GHz) class optics to reduce the cost of high speed PON. The OLT channel compensation methods disclosed herein can improve the signal quality for customers. For example, better channel compensation provides approximately a 2-3 decibel (dB) improvement in receiver sensitivity.

By storing channel responses from more preceding bursts in the weighted averaging process, better channel estimation and compensation and thus lower BER are obtained. Also, a smaller forgetting factor tends to provide better performance (lower BER) after convergence. At a forgetting factor of 0.1, the BER was reduced from 0.012 to below 0.002 after 50 preceding bursts are used to aid the channel estimation/compensation. The resulting performance gain is over 2 dB. To achieve the same performance, the conventional approach where only the TSs inside a burst are used to aid the channel estimation/compensation of the burst was found to need about 10 times more TSs, which means about 10 times slower tracking speed and/or larger overhead for TSs. The forgetting factor a can be chosen to be around 0.1, e.g., between about 0.02 and about 0.2, for example.

The use of ONU-specific channel response information achieves fast and accurate tracking of clock frequency and phases. Assuming a 3 parts per million (ppm) difference in clock offset and a 64,000 bits burst length, there may be an about 6 dB gain in receiver sensitivity when the embodiments disclosed herein are utilized. In addition, assuming a 25 gigasamples per second (Gsps) and a 125 microsecond burst duration, then a high clock accuracy of 10 parts per billion (ppb) may be needed to have less than a 1 dB penalty without using the disclosed clock difference compensation method. Therefore, there is a need for the systems, methods, and apparatuses disclosed herein that achieve fast and accurate channel tracking for burst-mode upstream transmission in PON systems using spectrally efficient formats based on OFDM or DMT.

The systems, methods, and apparatuses disclosed herein allow for increased channel tracking speed. For example, the processing latency is reduced and the DSP complexity is reduced. The upstream bursts may be shortened because channel tracking is performed faster. Also, tracking overhead may be minimized. The systems, methods, and apparatuses disclosed herein also allow for increased tracking accuracy. The receiver sensitivity may be performed using the embodiments disclosed herein. In this way, lower cost components can be used, links may be budgeted better, and OLTs can cover more users. All of these may contribute to greatly increased cost efficiency.

In an embodiment, the disclosure includes a method comprising a means for receiving a burst from a second NE, wherein the burst comprises at least one TS, storing a channel response for a link between the first NE and the second NE, wherein the first NE is communicatively coupled to the second NE, wherein the channel response is based on a current channel response estimated using at least one TS in the burst and a previously stored channel response, and wherein the previously stored channel response is based on a plurality of bursts previously received from the second NE, and compensating modulated symbols in the burst using the channel response.

In an embodiment, the disclosure includes an OLT comprising a means for receiving a burst from an ONU, wherein the burst comprises at least one TS, a means for storing a channel response for a link between the OLT and the ONU, wherein the channel response is based on a current channel response estimated using the at least one TS in the burst and a previously stored channel response, and wherein the previously stored channel response is determined using a plurality of bursts previously received from the ONU, a means for compensating modulated symbols in the burst using the channel response.

In an embodiment, the disclosure includes an OLT comprising a means for receiving a burst from an ONU, wherein the burst comprises at least one TS, a means for obtaining the at least one TS from the burst, a means for generating a current channel response for the burst transmitted by a link between the OLT and the ONU, and a means for storing a channel response for the link between the OLT and the ONU, wherein the channel response is based on the current channel response and a stored channel response, and wherein the stored channel response is based on a plurality of bursts previously received from the ONU.

Figure 9:
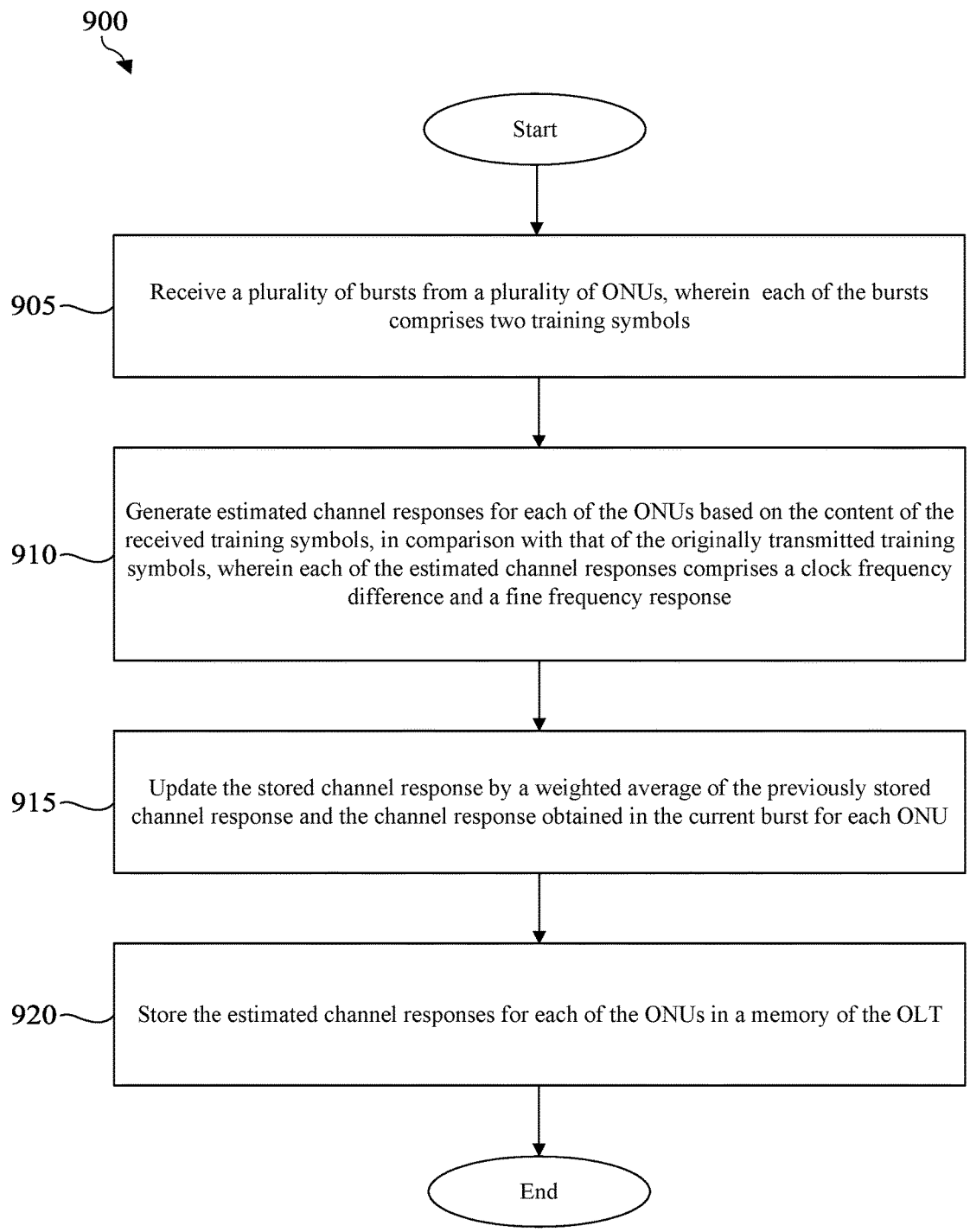
FIG. 9 is a flowchart illustrating a method of ONU-dependent channel storing according to an embodiment of the disclosure.

FIG. 9 is a flowchart illustrating a method 900 of ONU-dependent channel storing according to an embodiment. For example, the method 900 may be implemented by one or more of the ONUs$_{1-n}$ 150$_{1-n}$. In an embodiment, the method 900 may be implemented by the ONU channel tracking module 270 when TSs are received in a payload from an ONU. At block 905, bursts of packets (also referred to herein as bursts) are received from a plurality of ONUs. For example, the Rx 220 receives the bursts of packets from the ONUs. In an embodiment, each of the bursts comprises at least two TSs. For example, the two TSs may be inserted on either end of the burst payload, as described in FIGS. 4A-C.

At block 910, estimated channel responses are generated for each of the ONUs based on the content of the received TSs, in comparison with that of the originally transmitted (known) TSs. For example, the processor 230 is configured to estimate channel responses for each of the ONUs based on the content of the received TSs. In an embodiment, each of the estimated channel responses comprises a clock frequency difference and a fine frequency response. The clock frequency difference is a clock frequency difference between the ONU transmitter (Tx 240) and the OLT receiver (Rx 220). The clock frequency difference may be estimated by two TSs, respectively, located at the beginning and end of the signal burst, as described in FIGS. 4A-C. In an embodiment, the clock frequency difference between each ONU transmitter and each OLT receiver is estimated by comparing a phase slope difference between frequency-domain channel responses estimated by the TSs in the previous signal bursts from the same ONU, with the consideration of the time duration between these two TSs, which may be provided by the MAC. Note that these TSs may reside in the same burst, or reside in different bursts originated from the same ONU. In an embodiment, the clock frequency difference is stored as channel response information in ONU channel tracking 280 in a memory 260 of the OLT.

In another embodiment, the stored channel response information includes the fine channel response in the absence of clock/phase offset. The TSs (TS1 and TS2) travel through the links between the ONU and the OLT and experience power losses. Hence, the TSs (TS1 and TS2) may be contaminated by noise upon amplification and/or photo-detection. Therefore, averaging the channel responses estimated by multiple TSs may provide a more accurate and reliable estimate of the channel response. In an embodiment, the fine frequency response may be estimated by averaging in an intra-symbol frequency domain over a small number of subcarriers. In an embodiment, the fine frequency response may be estimated by averaging in an inter-symbol frequency domain (using multiple TSs in multiple preceding signal bursts) on a per-subcarrier basis. The fine frequency response may thus be as fine as the channel response at each subcarrier frequency of the OFDM or DMT signal for each ONU. With accurate per-subcarrier based channel estimation, the FFT and IFFT used may be small, and a low processing latency, low processing complexity, and low processing power may be achieved.

At block 915, the stored channel responses are updated by a weighted average of the previously stored channel response and the channel response obtained in the current burst for each ONU. In an embodiment, the stored channel responses may be dynamically updated upon receiving more bursts from each ONU such that the OLT receiver is adapting to the channel conditions dynamically. The dynamical updating process may be based on a weighted average of the previously stored channel response and the channel response obtained in the current burst, for each ONU. For example, the stored channel response is updated by the following averaging process shown in equation (2):

$$R_{past,n} = (1-a_n) \cdot R_{past,n} + a_n \cdot R_{current,n} \quad (2)$$

where $R_{past,n}$ is the stored channel response for the n-th ONU, $R_{current,n}$ is the channel response obtained after processing the current signal burst from the n-th ONU, and coefficient $a_n$ is the forgetting factor for the n-th ONU, which may be chosen to be between about 0.02 and about 0.2. At block 920, the estimated channel response for each of the ONUs may be stored in a memory of the OLT. For example, the estimated channel responses for each of the ONUs may be stored in the ONU channel tracking 280 of the memory 260.

Figure 10:
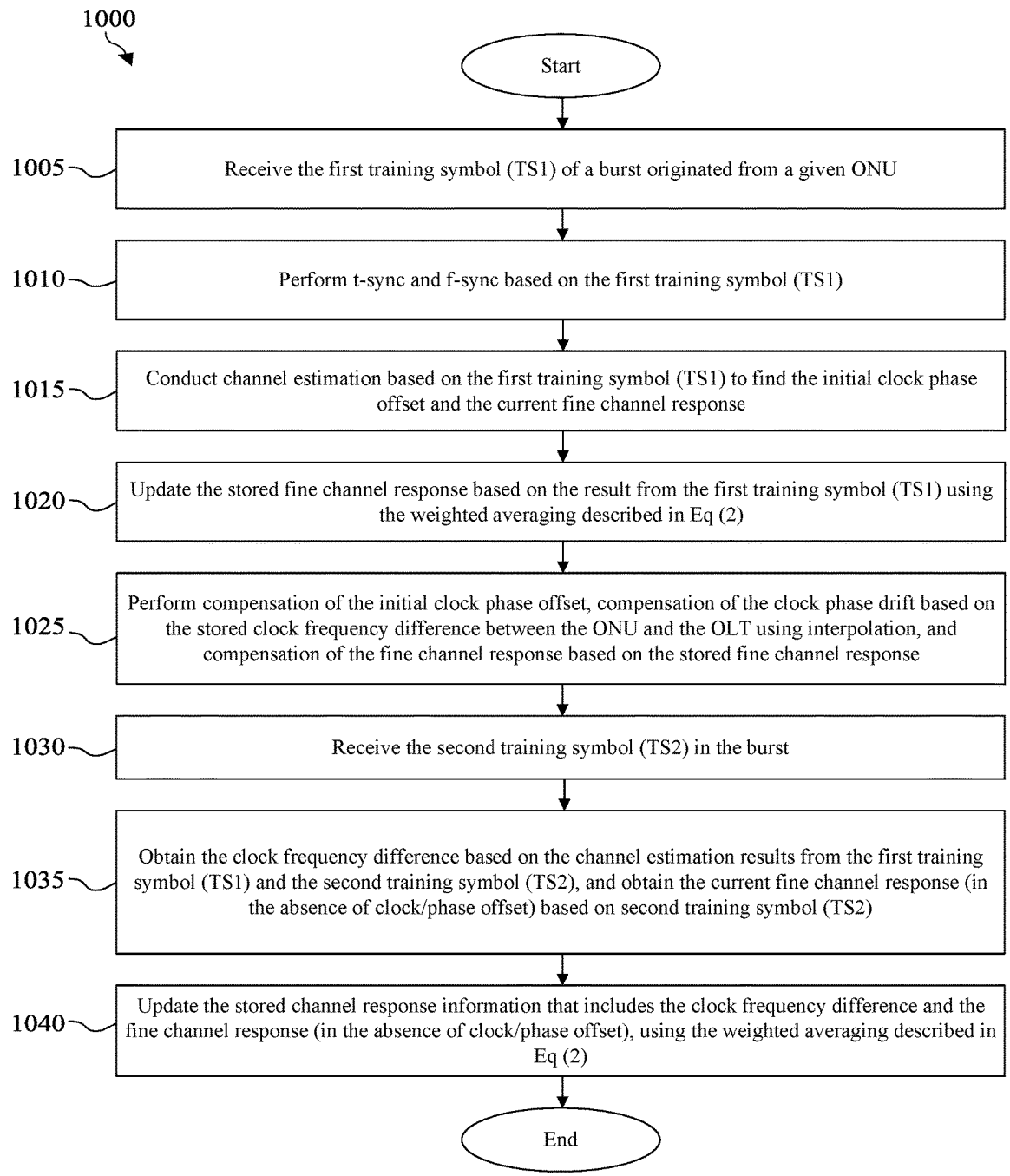
FIG. 10 is a flowchart illustrating a method of ONU-dependent channel tracking according to an embodiment of the disclosure.

FIG. 10 is a flowchart illustrating a method 1000 of ONU-dependent channel tracking according to an embodiment. For example, the method 1000 may be implemented by one or more of the ONUs$_{1-n}$ 150$_{1-n}$. In an embodiment, the method 1000 may be implemented by channel tracking module 270 when packet bursts (also referred to herein as bursts) are received from ONUs. At block 1005, the first TS (TS1) of a burst originated from a given ONU is received. For example, the Rx 220 receives the first TS (TS1) of a burst originated from a given ONU.

At block 1010, t-sync and f-sync functions are performed and the initial clock phase offset is found, based on the comparison between the received first TS (TS1) and the originally transmitted TS1, which is known to the receiver. For example, the processor 230 performs the t-sync and f-sync functions. At block 1015, channel estimation based on the first TS (TS1) is conducted to find the initial clock phase offset and the fine channel response. For example, the processor 230 performs channel estimation based on the first TS (TS1). At block 1020, the stored fine channel response is updated based on the result from first TS (TS1) using the weighted averaging described in Eq. (2). For example, the stored channel response is updated in the ONU channel tracking 280 of the memory 260.

At block 1025, for each of the payload OFDM or DMT symbols, compensation of the initial clock phase offset is performed, compensation of the clock phase drift based on the stored clock frequency difference between the ONU and the OLT using interpolation is performed, and compensation of the fine channel response based on the stored fine channel response is performed. For example, processor 230 performs compensation of the initial clock phase offset, performs compensation of the clock phase drift based on the stored clock frequency difference between the ONU and the OLT using interpolation, and performs compensation of the fine channel response based on the stored fine channel response. In an embodiment, the clock frequency difference calculated based on the first TS of the current burst is interpolated with the clock frequency differences stored for the ONU sending the current burst. The clock frequency difference between each ONU transmitter and the OLT receiver can be interpolated over time to provide a gradual change in the phase slope in the frequency-domain channel response of the channel equalizer. By interpolating the clock frequency difference computed for the current burst into the stored clock frequency difference, clock frequency/phase offsets of all the OFDM and/or DMT symbols are better compensated in the same burst because only the first TS has to be examined. There is no need to wait for the second TSs or the other payload symbols to update the clock frequency difference. Therefore, the receiver of the OLT is adjusted after the first TS without having to wait to receive a second TS. In this way, the embodiments disclosed herein provide for a much faster method of channel equalization. Similarly, the compensation of the fine channel response is performed based on the stored fine channel response such that fast and accurate channel compensation is achieved for each payload symbol.

At block 1030, the second TS (TS2) in the burst is received for channel estimation. For example, Rx 220 receives the second TS (TS2) in the burst for channel estimation. At block 1035, the clock frequency difference is obtained based on channel estimation results from the first TS (TS1) and the second TS (TS2). In addition, the current fine channel response (in the absence of clock/phase offset) is obtained based on the second TS (TS2). For example, processor 230 obtains the clock frequency difference based on channel estimation results from the first TS (TS1) and the second TS (TS2). The processor 230 may also obtain the current fine channel response (in the absence of clock/phase offset) based on the second TS (TS2). At block 1040, the stored channel response information that includes the clock frequency difference and the fine channel response (in the absence of clock/phase offset) is updated by using the weighted averaging described in Eq. (2). For example, the stored channel response is updated in the ONU channel tracking 280 of the memory 260. The stored channel responses are used to aid in channel equalization of the next burst from the same ONU. The above described methods 900 and 1000 continue such that following signal bursts from the each ONU are adaptively and accurately equalized.

Figure 11:
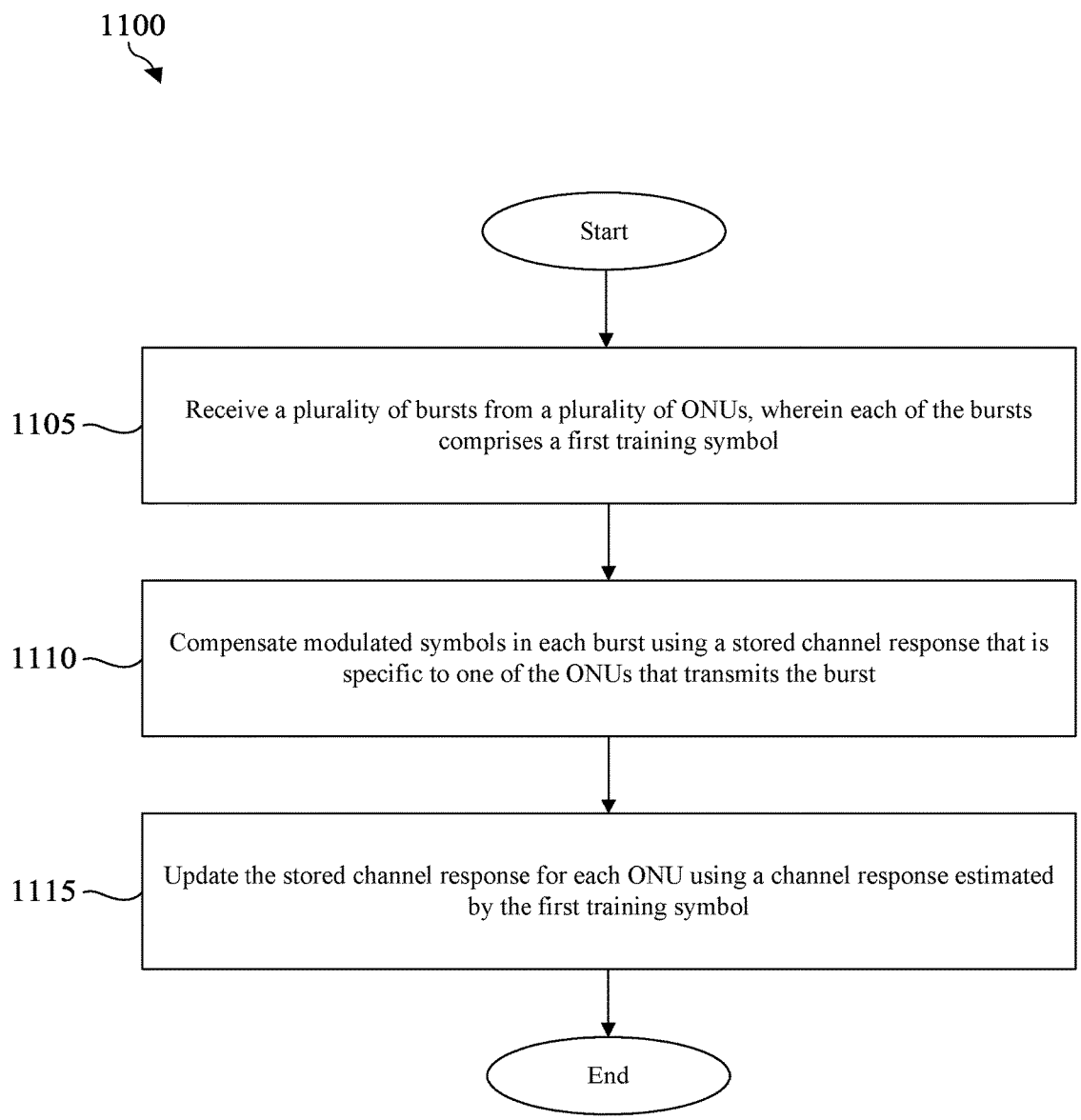
FIG. 11 is a flowchart illustrating a method of ONU-dependent channel tracking according to an embodiment of the disclosure.

FIG. 11 is a flowchart illustrating a method 1100 of ONU-dependent channel tracking according to an embodiment. The method 1100 may be implemented by the $ONUs_{1-n}$, $150_{1-n}$. In an embodiment, the method 1100 may be implemented by channel tracking module 270 when packet bursts are received from ONUs. At block 1105, a plurality of bursts from a plurality of ONUs are received. For example, Rx 220 receives a plurality of bursts from a plurality of ONUs.

At block 1110, modulated symbols in each burst are compensated using a stored channel response that is specific to the one of the ONUs that transmits the burst. For example, the processor 230 performs compensation on the modulated symbols in each burst using a stored channel response that is specific to the one of the ONUs that transmits the burst. At block 1115, the stored channel response for each ONU is updated using a channel response estimated by the first TS (TS1). For example, the ONU channel tracking 230 in memory 260 is updated for each ONU using a channel response estimated by the first TS (TS1).

DMT may be used to achieve 25 gigabits per second (Gb/s) transmission with 10 gigahertz (GHz) class optics to reduce the cost of high speed PON. The OLT channel compensation methods disclosed herein can improve the signal quality for customers. For example, better channel compensation provides approximately a 2-3 dB improvement in receiver sensitivity.

Figure 12:
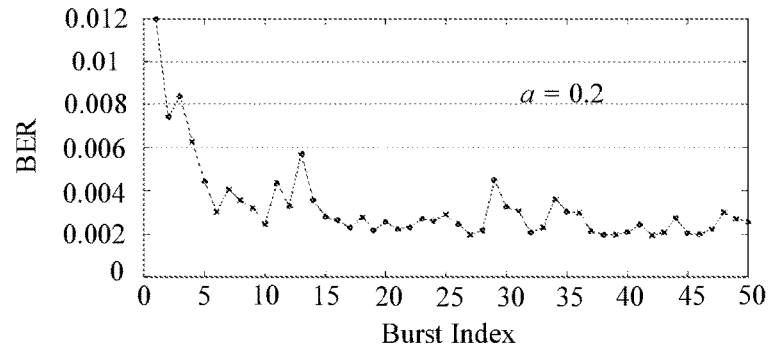
FIG. 12 includes graphs showing experimentally measured bit error rate (BER) of a DMT signal according to an embodiment of the disclosure.
Figure 12:
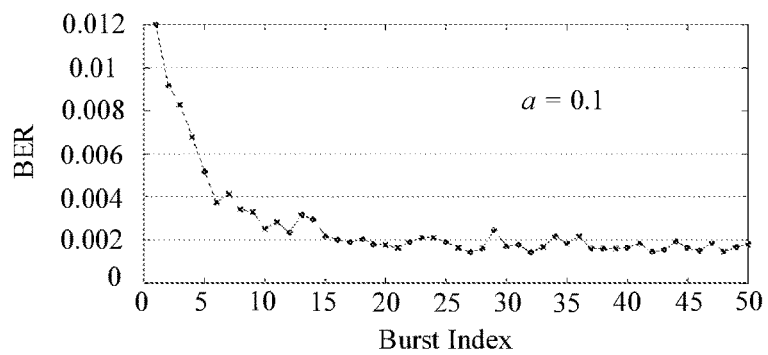
Figure 12:
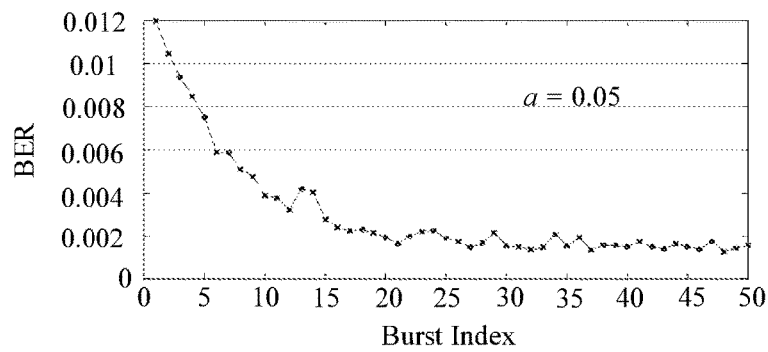

FIG. 12 includes graphs showing experimentally measured BER of a DMT signal with a FFT/IFFT size of 256 as a function of the burst index, counted from the first burst when the weighted averaging process described in Eq. (2) is activated, for a forgetting factor (a) of 0.2 (upper subplot), 0.1 (middle subplot), and 0.05 (lower subplot). As shown in the graphs, the use of more preceding bursts in the weighted averaging process results in better channel estimation and compensation, and thus lower BER. Also, a smaller forgetting factor tends to provide better performance (lower BER) after convergence. At a forgetting factor of 0.1, the BER was reduced from 0.012 to below 0.002 after 50 preceding bursts are used to aid the channel estimation/compensation. The resulting performance gain is over 2 dB. To achieve the same performance, the conventional approach (where only the TSs inside a burst are used to aid the channel estimation/compensation of the burst) was found to need about 10 times more TSs, which means about 10 times slower tracking speed and/or larger overhead for TSs. The forgetting factor a can be chosen to be around 0.1, e.g., between about 0.02 and about 0.2.

The use of ONU-specific channel response information achieves fast and accurate tracking of clock frequency and phases. Assuming a 3 parts per million (ppm) difference in clock offset and a 64,000 bits burst length, there may be a 6 dB gain in receiver sensitivity when the embodiments disclosed herein are utilized. In addition, assuming a 25 gigasamples per second (Gsps) and a 125 microsecond burst duration, then a high clock accuracy of 10 parts per billion (ppb) may be needed to have less than a 1 dB penalty without using disclosed clock difference compensation method. The systems, methods, and apparatuses disclosed herein achieve fast and accurate channel tracking for burst-mode upstream transmission in PON systems using spectrally efficient formats based on OFDM or DMT.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a first network element (NE), comprising:
    receiving, by a receiver of the first NE communicatively coupled to a second NE, a burst comprising at least one training symbol (TS) from the second NE;
    storing, by a memory of the first NE, a channel response for a link between the first NE and the second NE, the channel response being based on a current channel response estimated using at least one TS in the burst and a previously stored channel response that is based on a plurality of bursts previously received from the second NE; and
    compensating, by a processor coupled to the receiver and the memory of the first NE, modulated symbols in the burst using the channel response.

2. The method of claim 1, wherein the at least one TS comprises a first TS and a second TS, wherein the first TS is at a beginning of a payload of the burst, wherein the second TS is at an end of the payload of the burst, and wherein the first TS and the second TS are used to determine the channel response.

3. The method of claim 1, wherein the modulated symbols are modulated according to a discrete multi-tone (DMT) modulation format.

4. The method of claim 1, wherein the channel response comprises a fine channel response in a frequency domain.

5. The method of claim 1, wherein the channel response includes a clock frequency difference between the first NE and the second NE.

6. The method of claim 5, wherein the clock frequency difference between the first NE and the second NE is estimated by comparing a phase slope difference between frequency-domain channel responses estimated by two TSs received from the second NE and based on a time duration between the two TSs.

7. The method of claim 1, wherein the channel response is updated based on a weighted average of a plurality of previous channel responses and the current channel response.

8. An optical line terminal (OLT), comprising:
    a receiver configured to receive a burst comprising at least one training symbol (TS) from an optical network unit (ONU);
    a memory configured to store a channel response for a link between the OLT and the ONU, the channel response being based on a current channel response estimated using the at least one TS in the burst and a previously stored channel response that is determined using a plurality of bursts previously received from the ONU; and
    a processor coupled to the memory and the receiver and configured to compensate modulated symbols in the burst using the channel response.

9. The OLT of claim 8, wherein the processor is further configured to compensate a clock frequency difference between the OLT and the ONU.

10. OLT of claim 9, wherein compensating the clock frequency difference between the OLT and the ONU is based on interpolation.

11. The OLT of claim 8, wherein the channel response comprises a weighted average of a plurality of previous channel responses, wherein the plurality of previous channel responses are determined based on the plurality of bursts previously received from the ONU.

12. The OLT of claim 8, wherein the at least one TS in the burst is used to determine the current channel response for the burst.

13. The OLT of claim 12, wherein the channel response is a weighted average between the current channel response and the previously stored channel response.

14. An optical line terminal (OLT), comprising:
    a receiver configured to receive a burst comprising at least one training symbol (TS) from an optical network unit (ONU);
    a processor coupled to the receiver configured to:
        obtain the at least one TS from the burst; and
        generate a current channel response for the burst transmitted by a link between the OLT and the ONU; and
    a memory coupled to the processor and configured to store a channel response for the link between the OLT and the ONU, the channel response being based on the current channel response and a stored channel response is based on a plurality of bursts previously received from the ONU.

15. The OLT of claim 14, wherein the processor is configured to compensate modulated symbols in the burst using the current channel response and the stored channel response.

16. The OLT of claim 14, wherein the current channel response comprises a fine channel response in a frequency domain, wherein the fine channel response is generated on a per-subcarrier basis.

17. The OLT of claim 14, wherein the stored channel response comprises a weighted average of a plurality of previous channel responses, wherein the plurality of previous channel responses are determined based on the plurality of bursts previously received from the ONU.

18. The OLT of claim 17, wherein a weighting for the plurality of previous channel responses is between about 0.02 and about 0.2.

19. The OLT of claim 14, wherein the stored channel response includes a clock frequency difference between the OLT and the ONU.

20. The OLT of claim 19, wherein the clock frequency difference between the OLT and the ONU is estimated by comparing a phase slope difference between frequency-domain channel responses estimated by two TSs from the ONU and based on a time duration between the two TSs.

* * * * *